(12) United States Patent
Yasunami et al.

(10) Patent No.: US 11,307,551 B1
(45) Date of Patent: Apr. 19, 2022

(54) METHODS, SYSTEMS AND COMPUTER PROGRAM PRODUCTS FOR GENERATING IMPLEMENTABLE SEQUENTIAL FUNCTION CHARTS CODES FOR PROCESS CONTROL SYSTEMS

(71) Applicant: Yokogawa Electric Corporation, Tokyo (JP)

(72) Inventors: Daisuke Yasunami, Singapore (SG); Yi Ee Loke, Singapore (SG); Maricel Mercurio Bacacao, Singapore (SG); Archie Sambitan Orido, Singapore (SG); Max Jisong Zhang, Singapore (SG); Wilfred Woon Yew Teo, Singapore (SG); Hiroyuki Nakamura, Singapore (SG); Tadateru Ohkawara, Singapore (SG); Keiko Yuasa, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/177,707

(22) Filed: Feb. 17, 2021

(51) Int. Cl.
| | |
|---|---|
| *G06F 9/44* | (2018.01) |
| *G05B 19/042* | (2006.01) |
| *G06F 8/30* | (2018.01) |
| *G06F 8/33* | (2018.01) |
| *G06Q 10/06* | (2012.01) |

(52) U.S. Cl.
CPC ........... *G05B 19/0426* (2013.01); *G06F 8/30* (2013.01); *G06F 8/33* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 7,290,048 | B1* | 10/2007 | Barnett | G06F 11/3495 709/223 |
| 10,073,764 | B1* | 9/2018 | Sundermier | G06F 11/3692 |
| 11,119,798 | B2* | 9/2021 | Tshouva | H04L 9/0643 |
| 2002/0194277 | A1* | 12/2002 | Sakimura | G06Q 10/0637 709/205 |
| 2015/0236453 | A1* | 8/2015 | Magee, Jr. | H01R 13/70 307/40 |
| 2015/0256709 | A1* | 9/2015 | Sugimura | H04N 1/00474 358/1.13 |
| 2020/0219593 | A1* | 7/2020 | Eteminan | G06F 3/04845 |

\* cited by examiner

*Primary Examiner* — Anna C Deng
(74) *Attorney, Agent, or Firm* — Sheridan Ross P.C.

(57) ABSTRACT

The invention provides, methods, systems and computer program products that enable generation of executable sequential function charts, for subsequent retrieval and implementation by a process control system. In an embodiment, generating an executable sequential function chart comprises (i) receiving equipment selection data representing a selected equipment for implementing operating functions within a sequence flow, (ii) receiving operation data representing a set of operating functions intended to be implemented by the selected equipment, (iii) assigning values to one or more configuration parameters, (iv) receiving control statement data representing a set of control statements intended to be implemented for process flow control during implementation of the set of operating functions, (v) assigning values to one or more control statement configuration parameters, and generating machine readable SEBOL program code for implementing the set of operating functions.

15 Claims, 20 Drawing Sheets

Figure 1:
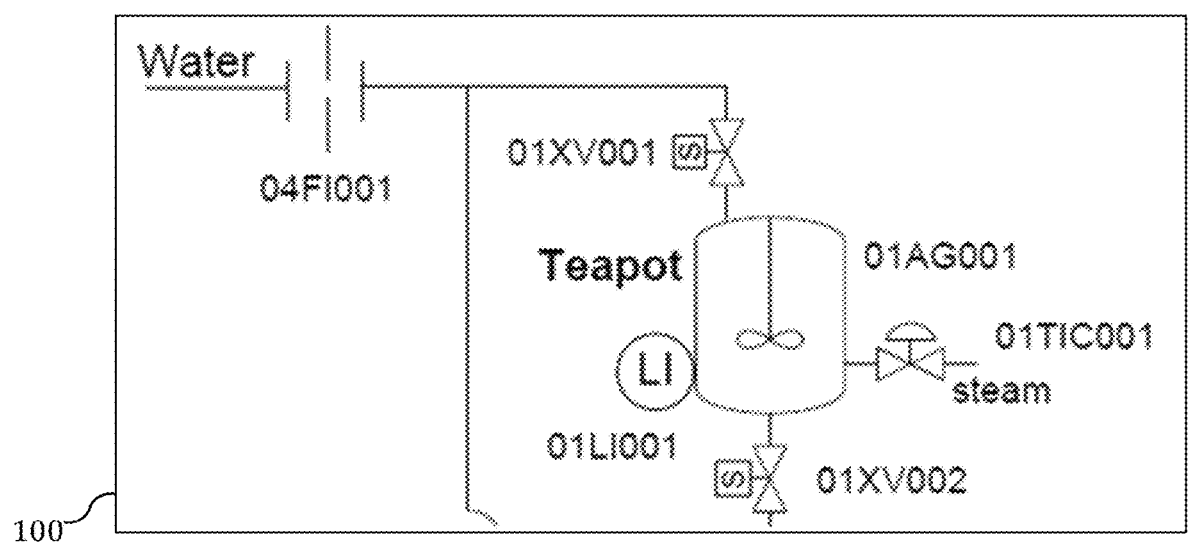

METHODS, SYSTEMS AND COMPUTER PROGRAM PRODUCTS FOR GENERATING IMPLEMENTABLE SEQUENTIAL FUNCTION CHARTS CODES FOR PROCESS CONTROL SYSTEMS

FIELD OF THE INVENTION

The invention relates to the field of industrial automation and process control systems. More specifically, the invention provides, methods, systems and computer program products that enable generation of executable sequential function charts, for subsequent retrieval and implementation by a process control system.

BACKGROUND OF THE INVENTION

Industrial environments implement control systems (for example, distributed process control systems) for running and controlling processes for manufacturing, conversion, or production. Control systems typically include one or more process controllers that are connected to one or more field devices. Field devices, may include valves, valve actuators, switches, and transmitters (e.g. temperature, pressure, level, and flow sensors) located within the industrial environment, and which are configured for physical control functions or process control functions. Examples of field device control functions include opening or closing valves, and measuring process and/or environmental parameters (e.g. temperature or pressure) for controlling one or more processes within the process plant or system.

At the other end, a process controller within the control system may be configured to receive signals generated by field devices, wherein the received signals convey information corresponding to process parameters measured by the field devices and/or other information concerning states of the field devices. The process controller may additionally execute a control application that implements one or more control modules for implementing process control decisions. Control modules within the process controller send control signals to field devices through communication lines or connections, to control operation of one or more of the field devices. Input-output (I/O) devices that are located as communication intermediaries between a process controller and one or more field devices enable data transfer and control instruction transfers between the process controller and the field devices, by converting electrical signals to digital values and by sending and receiving such signals over one or more communication protocols.

A control system within a process plant may include one or more process controllers, and each controller is connected to one or more field devices via I/O cards and/or I/O ports. The one or more controllers store control applications and implement control strategies for the control and operation of field devices. The control system may be configured to track or collect data related to the various plant assets or plant equipment, including, but not limited to, field devices, rotating equipment and key machineries. The control system retrievably stores device-related data and/or performance data for all devices or assets in a plant or group of plants, for the purposes of monitoring the statuses and health of plant assets and conducting maintenance work. Additionally, the control system may be configured to serve as a communication intermediary between a plant operator or an operator terminal on one hand, and one or more field devices on the other hand—for the purposes of enabling efficient configuration, commissioning, inspection, and maintenance of such field devices.

For the purposes of the present written description, it will be understood that references to a "field device" may include references to any of valves, valve actuators, switches, transmitters, smart transmitters, positioners, or other sensor devices that may be located within an industrial process environment, and that may be configured for physical or process control functions. Field devices may include "smart" field devices—i.e. devices that support digital communication protocols such as HART or Foundation Fieldbus communication protocols.

For the purposes of the present written description, references to "control system(s)" shall be understood as references to any control system(s) that may be implemented within a process control environment, an industrial plant, or an industrial environment, and shall include distributed control systems (DCS) and/or safety control systems (SCS).

For the purposes of the below written description, the term "physical device tag" shall mean a device name or device identifier that is associated with an actual field device. Ideally every field device located within an industrial environment or that is coupled with a control system within an industrial environment is provided with a unique physical device tag. Typically, each field device is provided with a local memory, and the physical device tag corresponding to such field device is retrievably stored within the local memory. When a field device is coupled with a control system, the control system can retrieve and read the physical device tag corresponding to the field device, and use such physical device tag as a unique identifier corresponding to the field device, for the purposes of field device operation, control or monitoring.

For the purposes of the below written description, the term "system tag" shall mean a name or identifier that is uniquely associated with a software function block or software control module, within a control system, and which software function block or software control module is configured to control, monitor or interface with a particular field device. Ideally every software function block of software control module that is configured to control, monitor or interface with a field device is provided with a unique system tag. System tags are used by the control system to implement, control and/or operate the corresponding software function block or software control module.

For the purposes of the below written description, the term "tag" by itself shall be understood to refer to either a physical device tag or a system tag.

When configuring and implementing processes within industrial environments, a piping and instrumentation diagram (P&ID) is used as a diagram to illustrate the piping of process flow together with installed equipment and instrumentation. Typically, one or more P&IDs are provided to engineers in the form of a print out, or in the form of a PDF-file or an image file. A P&ID typically includes standardized symbols and numbers for pipes, signal lines, instruments, and groups of instruments.

During the process control environment design process (e.g. an industrial plant design process), control engineers may design a process control system based on the P&ID drawing. The control engineer would read the P&ID, and extract engineering data therefrom. The engineering data may be used for configuring a batch process or one or more other processes within the process control environment.

FIG. 1 illustrates an exemplary P&ID 100. P&ID 100 shown in FIG. 1 illustrates a process environment for making and dispensing tea and includes representations of a teapot, inlet and outlet valves, water and steam inputs, and the corresponding piping, valve and control components involved in said processes.

The processes represented within a P&ID may be captured and represented using a sequential function chart (SFC). A SFC is a sequence of program code expressed in a graphical programming language—wherein the sequence of program code is generated for implementation within a process control system. It can be used to program processes that are capable of being represented as a series of sequentially organized steps that are implemented within the process control system.

Figure 2:
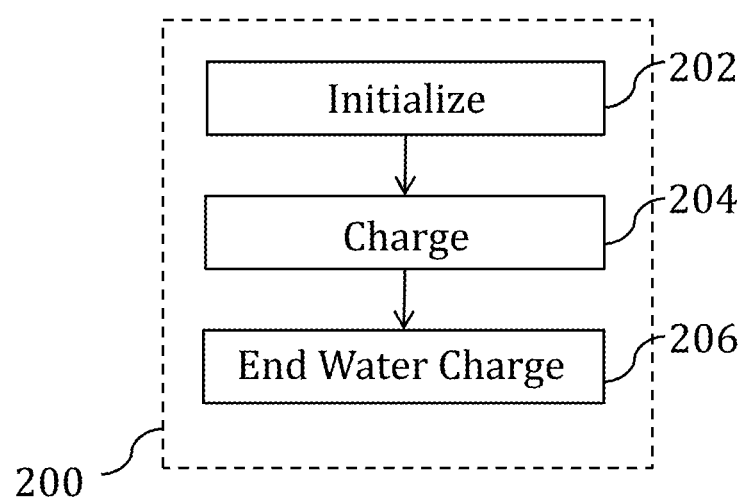

For example, FIG. 2 illustrates a SFC 200 for implementing the process of charging a teapot with water for making and dispensing tea within the process environment 100 of FIG. 1. As shown in FIG. 2, SFC 200 comprises (i) initializing the process at step 202, (ii) charging the teapot at step 204, and (iii) ending the water charging step, at step 206.

Each step within a SFC is defined by program code in a graphical programming language (which in a preferred embodiment, is the Sequence and Batch Oriented Language (SEBOL) programming language). The program code defines the actions performed in each step. Existing systems for generating a SFC involve generation of a SFC within a SFC sequence builder interface. The SFC sequence builder interface is a graphical user interface that allows a user to define a series of ordered and linked steps.

When generating a SFC within a prior art SFC sequence builder interface, a user requires to refer to a P&ID frequently. This is because, the tag identifiers or tag names of physical equipment within the batch process require to be included within the corresponding program code, to enable the program code to manipulate and control the physical equipment.

Figure 3:
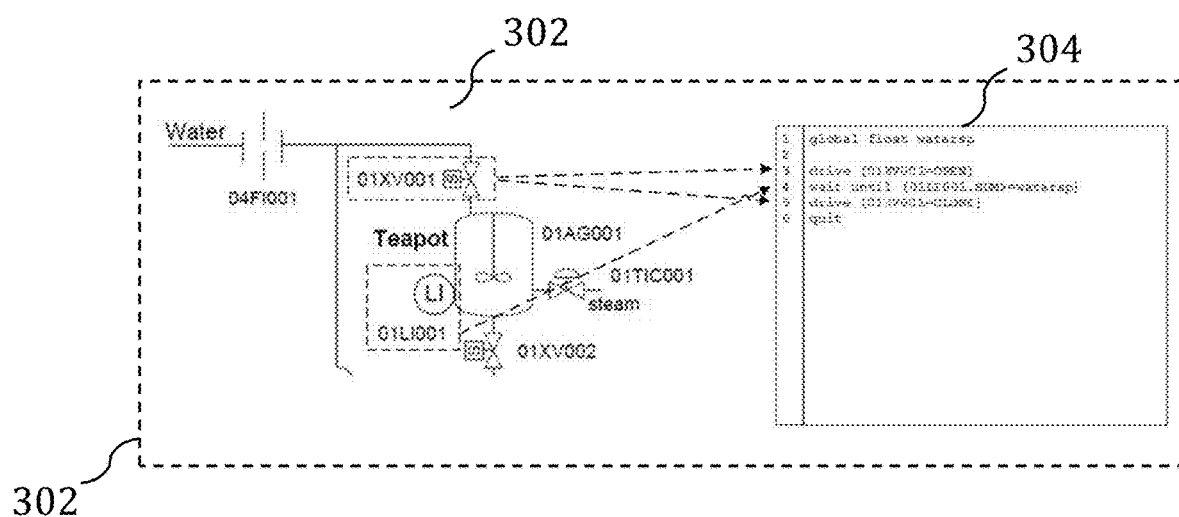

FIG. 3 provides a representation 300 of an exemplary P&ID 302 and corresponding program code 304 of a type that may be included within a SFC corresponding to P&ID 302. As can be seen from FIG. 3, various tag identifiers (e.g. 01XV001, 01L1001) from P&ID 302 are specifically included within corresponding segments of program code 304 for the purposes of enabling the SFC to manipulate and control the equipment corresponding to these tag identifiers. It will therefore be understood that when generating a SFC, a user requires to repeatedly refer to and view the corresponding P&ID.

Figure 4:
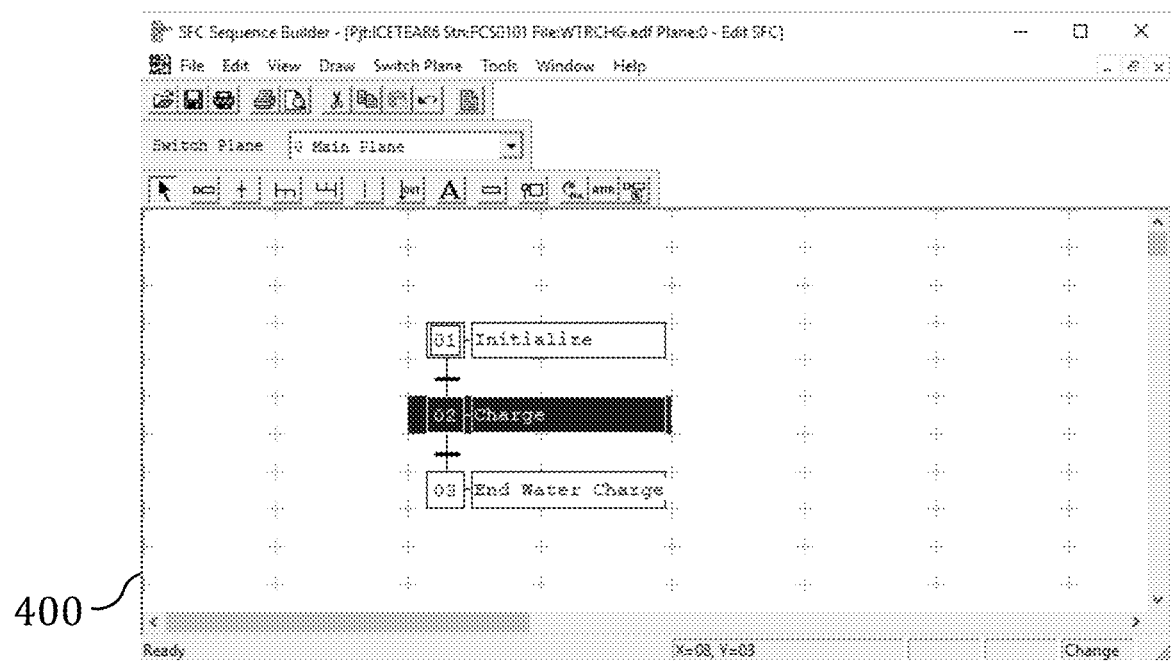

FIG. 4 illustrates a SFC sequence editor 400 of a kind that may be configured to enable generation of a SFC. The SFC sequence editor 400 may be configured such that an operation sequence that is implemented by one more specific equipment or one or more components thereof may be generated within the SFC sequence editor 400. The SFC sequence editor 400 may provide a drawing canvas for a user or control engineer to create an ordered sequence of steps to represent a sequence flow chart. Each step within the ordered sequence of steps may comprise one or more actions implementable on or by specific equipment or one or more components thereof. The sequence of steps may be ordered by using directed connectors to interconnect individual steps—wherein the directed connectors specify a control flow and may define how to proceed from one step to the next.

User input based or control engineer input based actions towards creating the ordered sequence of steps within the SFC sequence editor 400 require to be completed by coding steps implemented within a program code text editor, so as to allow a control engineer to specify or create programming code (for example, SEBOL code) that is intended to be implemented at one or more specific steps in the operation sequence that has been defined within the SFC sequence editor 400.

Figure 5:
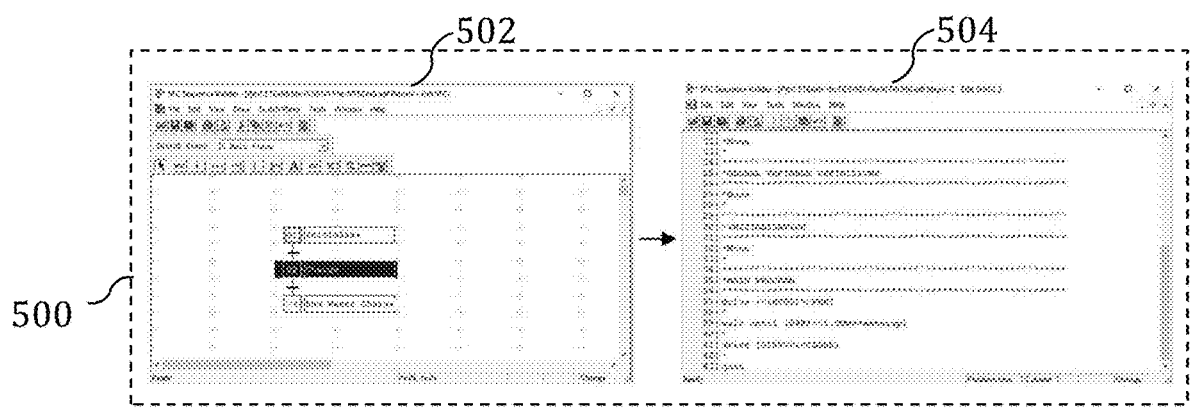

FIG. 5 provides a representation 500 of a SFC sequence editor 502 and a text based editor 504. Each step in a SFC that is under construction can be configured with program code (for example, SEBOL code). By selecting a step within a SFC within the SFC sequence editor 502 (for example by double clicking on it or triggering an appropriate command or interface option), the SFC sequence editor 502 calls up a text based editor (SFC sequence editor 504) onto the display so that the user or control engineer may write the program code (e.g. SEBOL code) corresponding to the selected step. Code written in the text editor SFC sequence editor 504 is associated or linked with the selected step of the SFC, so that when that step of the SFC is executed within a process control system, the corresponding program code is executed for the purposes of manipulating or controlling a specific equipment or component(s) thereof.

Prior art solutions of the kind described in connection with FIGS. 1 to 5 above present multiple disadvantages, including that:

since existing text based editors that are used to generate program code for SFCs do not integrate display of P&IDs within the editor, a user or control engineer has to continuously switch between the P&ID display and the text editor for the purposes of writing program code for a SFC corresponding to a P&ID, and manual writing of program code in a text based editor is slow, and error prone—particularly when the user or control engineer is not well-versed with the programming language.

There is accordingly a need for solutions that address these shortcomings in the existing state of art.

SUMMARY

The invention provides, methods, systems and computer program products that enable generation of executable sequential function charts, for subsequent retrieval and implementation by a process control system.

The invention provides a processor implemented method for generating program code within a sequential function chart for process control within a process control system. In an embodiment, the method comprises (i) receiving equipment selection data representing a selected equipment for implementing a sequence flow, (ii) receiving operation data representing a set of operating functions intended to be implemented by the selected equipment, (iii) assigning values to one or more operating function configuration parameters corresponding to one or more operating functions, (iv) receiving control statement data representing a set of control statements intended to be implemented for process flow control during implementation of the set of operating functions, (v) assigning values to one or more control statement configuration parameters corresponding to one or more control statements within the set of control statements, and (vi) generating machine readable program code for implementing the set of operating function, based on one or more of the received operation data, the received control statement data, the assigned operating function configuration parameters and the assigned control statement configuration parameters.

In a further embodiment of the method, the step of receiving equipment selection data comprises (i) receiving within a display interface 700, input comprising an equipment selective user input, (ii) rendering on a display, a visual representation of an equipment selected based on the equipment selective user input, (iii) receiving function block identifier data and function block type data associated with the selected equipment, and (iv) receiving operation data representing a set of operating functions intended to be implemented by the selected equipment.

The method step of receiving operation data representing a set of operating functions intended to be implemented by the selected equipment, may comprise (i) responding to receiving a user input, by displaying a list of operating functions performable on the selected equipment, (ii) receive through another user input, a selection of an operating function from the displayed list of operating functions, (iii) identifying an operating function type associated with the selected operating function, (iv) retrieving a set of configuration parameters associated with the identified operating function type, and (v) initiating display of the selected operating function within a display interface.

In an embodiment, the method step of assigning values to one or more operating function configuration parameters corresponding to one or more operating functions within the set of operating functions comprises (i) associating with a selected operating function, a set of selected operating function configuration parameters, (ii) retrieving default operating function configuration parameter values for one or more operating function configuration parameters within the set of selected operating function configuration parameters, (iii) assigning the default operating function configuration parameter values to corresponding operating function configuration parameters associated with the selected operating function, (iv) receiving user input identifying one or more user specified parameter values for assignment to one or more operating function configuration parameters within the set of selected operating function configuration parameters, and (v) assigning the user specified parameter values to operating function configuration parameters corresponding to the selected operating function.

In a particular embodiment, the method step of receiving control statement data representing a set of control statements intended to be implemented for process flow control during implementation of the set of operating functions comprises (i) displaying a list of selectable control statements for process flow control corresponding to one or more operating functions intended to be implemented by the selected equipment, (ii) selecting based on a user input, a control statement from the list of selectable control statements, (iii) retrieving a set of configuration parameters associated with the selected control statement, and (iv) initiating display of the selected control statement within the display interface.

In another embodiment of the method, the step of assigning values to one or more control statement configuration parameters corresponding to one or more control statements within the set of control statements comprises, (i) identifying a set of control statement configuration parameters corresponding to a control statement within the set of control statements, (ii) retrieving default configuration parameter values corresponding to one or more control statement configuration parameters within the identified set of control statement configuration parameters, (iii) assigning the default configuration parameter values to corresponding control statement configuration parameters, (iv) receiving user input identifying one or more user specified parameter values for assignment to one or more of the control statement configuration parameters, and (v) assigning the user specified parameter values to the corresponding control statement configuration parameters.

In a specific embodiment of the method, the step of generating machine readable SEBOL program code for implementing the set of operating functions comprises (i) retrieving a set of machine code generation rules corresponding to (a) a set of operating functions selected for implementation on the selected equipment, and (b) a set of control statements selected for process flow control corresponding to one or more operating functions within the set of operating functions, and (ii) generating machine readable program code for implementing the set of operating functions on the selected equipment, wherein the generated machine readable program code is based on (a) a retrieved set of machine code generation rules, (b) a set of operating functions and one or more operating function configuration parameter values assigned to one or more operating function configuration parameters associated with the set of operating functions, (c) a set of control statements and one or more control statement configuration parameter values assigned to one or more control statement configuration parameters associated with the set of control statements, and (d) a function block type data associated with the selected equipment.

The invention additionally provides a system for generating program code within a sequential function chart for process control within a process control system, the system comprising (i) a memory, and (ii) a processor configured for (a) receiving equipment selection data representing a selected equipment for implementing a sequence flow, (b) receiving operation data representing a set of operating functions intended to be implemented by the selected equipment, (iii) assigning values to one or more operating function configuration parameters corresponding to one or more operating functions, (iv) receiving control statement data representing a set of control statements intended to be implemented for process flow control during implementation of the set of operating functions, (v) assigning values to one or more control statement configuration parameters corresponding to one or more control statements within the set of control statements, and (vi) generating machine readable program code for implementing the set of operating function, based on one or more of the received operation data, the received control statement data, the assigned operating function configuration parameters and the assigned control statement configuration parameters.

The system may be configured such that the step of receiving equipment selection data comprises (i) receiving within a display interface, input comprising an equipment selective user input, (ii) rendering on a display, a visual representation of an equipment selected based on the equipment selective user input, (iii) receiving function block identifier data and function block type data associated with the selected equipment, and (iv) receiving operation data representing a set of operating functions intended to be implemented by the selected equipment.

In an embodiment, the system may be configured such that the step of receiving data representing a set of operating functions intended to be implemented by the selected equipment, comprises (i) responding to receiving a user input, by displaying a list of operating functions performable on the selected equipment, (ii) receive through another user input, a selection of an operating function from the displayed list of operating functions, (iii) identifying an operating function type associated with the selected operating function, (iv) retrieving a set of configuration parameters associated with the identified operating function type, and (v) initiating display of the selected operating function within a display interface.

In another embodiment, the system may be configured such that the step of assigning values to one or more operating function configuration parameters corresponding to one or more operating functions within the set of operating functions comprises (i) associating with a selected operating function, a set of selected operating function configuration parameters, (ii) retrieving default operating function configuration parameter values for one or more operating function configuration parameters within the set of selected operating function configuration parameters, (iii) assigning the default operating function configuration parameter values to corresponding operating function configuration parameters associated with the selected operating function, (iv) receiving user input identifying one or more user specified parameter values for assignment to one or more operating function configuration parameters within the set of selected operating function configuration parameters, and (v) assigning the user specified parameter values to operating function configuration parameters corresponding to the selected operating function.

In a particular embodiment, the system may be configured such that the step of receiving control statement data representing a set of control statements intended to be implemented for process flow control during implementation of the set of operating functions comprises (i) displaying a list of selectable control statements for process flow control corresponding to one or more operating functions intended to be implemented by the selected equipment, (ii) selecting based on a user input, a control statement from the list of selectable control statements, (iii) retrieving a set of configuration parameters associated with the selected control statement, and (iv) initiating display of the selected control statement within the display interface.

In a further embodiment of the system, the step of assigning values to one or more control statement configuration parameters corresponding to one or more control statements within the set of control statements comprises (i) identifying a set of control statement configuration parameters corresponding to a control statement within the set of control statements, (ii) retrieving default configuration parameter values corresponding to one or more control statement configuration parameters within the identified set of control statement configuration parameters, (iii) assigning the default configuration parameter values to corresponding control statement configuration parameters, (iv) receiving user input identifying one or more user specified parameter values for assignment to one or more of the control statement configuration parameters, and (v) assigning the user specified parameter values to the corresponding control statement configuration parameters.

The system may be configured such that the step of generating machine readable SEBOL program code for implementing the set of operating functions comprises (i) retrieving a set of machine code generation rules corresponding to (a) a set of operating functions selected for implementation on the selected equipment, and (b) a set of control statements selected for process flow control corresponding to one or more operating functions within the set of operating functions, and (ii) generating machine readable program code for implementing the set of operating functions on the selected equipment, wherein the generated machine readable program code is based on (a) a retrieved set of machine code generation rules, (b) a set of operating functions and one or more operating function configuration parameter values assigned to one or more operating function configuration parameters associated with the set of operating functions, (c) a set of control statements and one or more control statement configuration parameter values assigned to one or more control statement configuration parameters associated with the set of control statements, and (d) a function block type data associated with the selected equipment.

The invention also provides a computer program product for generating program code within a sequential function chart for process control within a process control system. The computer program product comprising a non-transitory computer usable medium having a computer readable program code embodied therein, the computer readable program code comprising instructions for implementing within a processor based computing system, the steps of (i) receiving equipment selection data representing a selected equipment for implementing a sequence flow, (ii) receiving data representing a set of operating functions intended to be implemented by the selected equipment, (iii) assigning values to one or more operating function configuration parameters corresponding to one or more operating functions, (iv) receiving control statement data representing a set of control statements intended to be implemented for process flow control during implementation of the set of operating functions, (v) assigning values to one or more control statement configuration parameters corresponding to one or more control statements within the set of control statements, and (vi) generating machine readable program code for implementing the set of operating function, based on one or more of the received operation data, the received control statement data, the assigned operating function configuration parameters and the assigned control statement configuration parameters.

BRIEF DESCRIPTION OF THE ACCOMPANYING DRAWINGS

Figure 6:
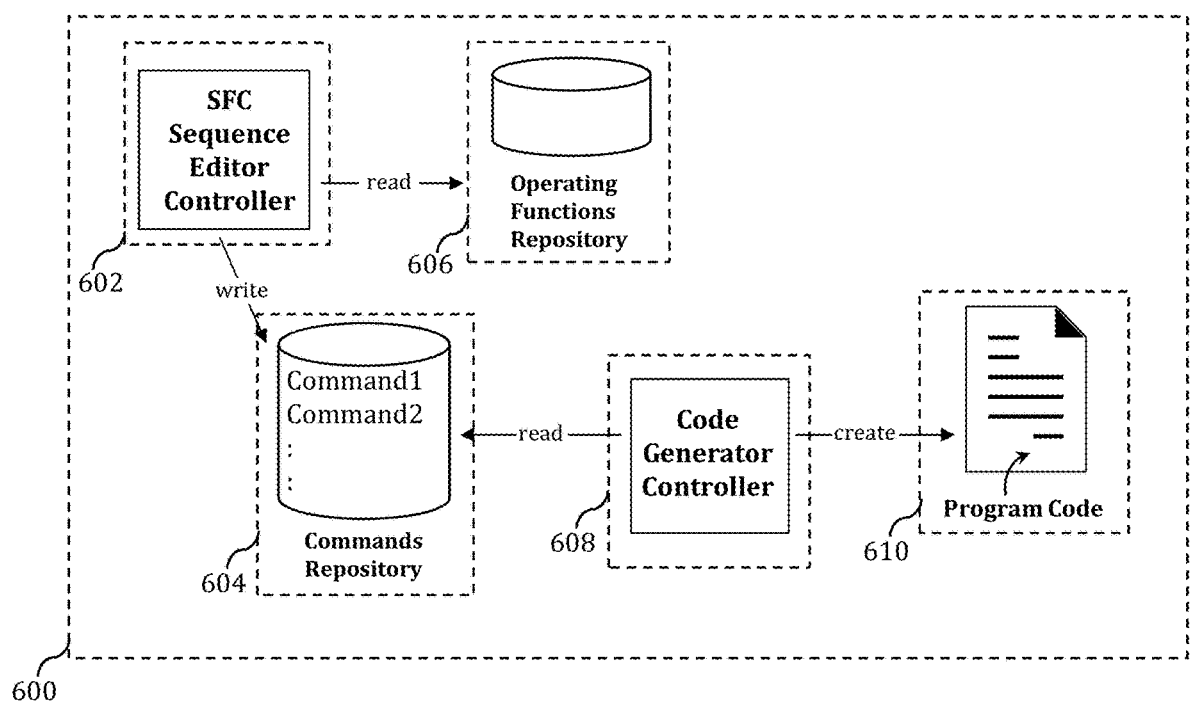
Figure 7:
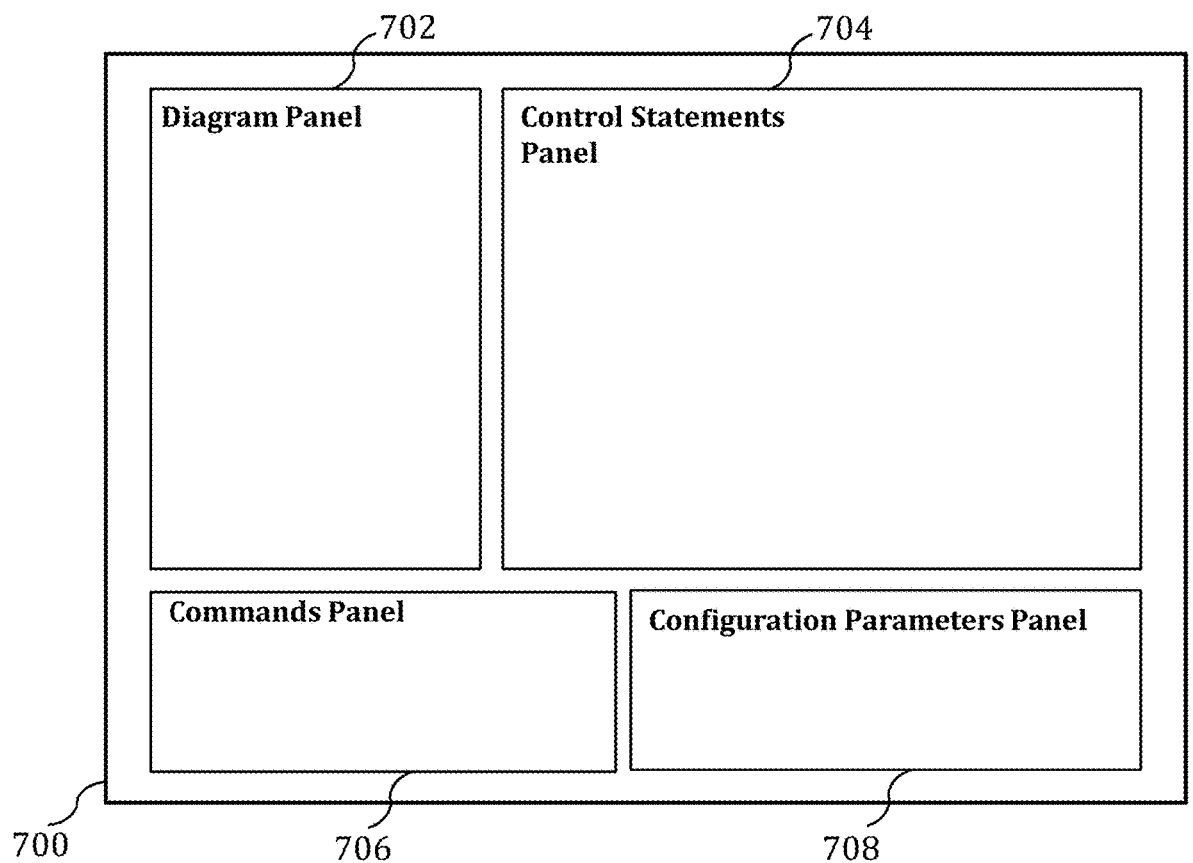
Figure 8:
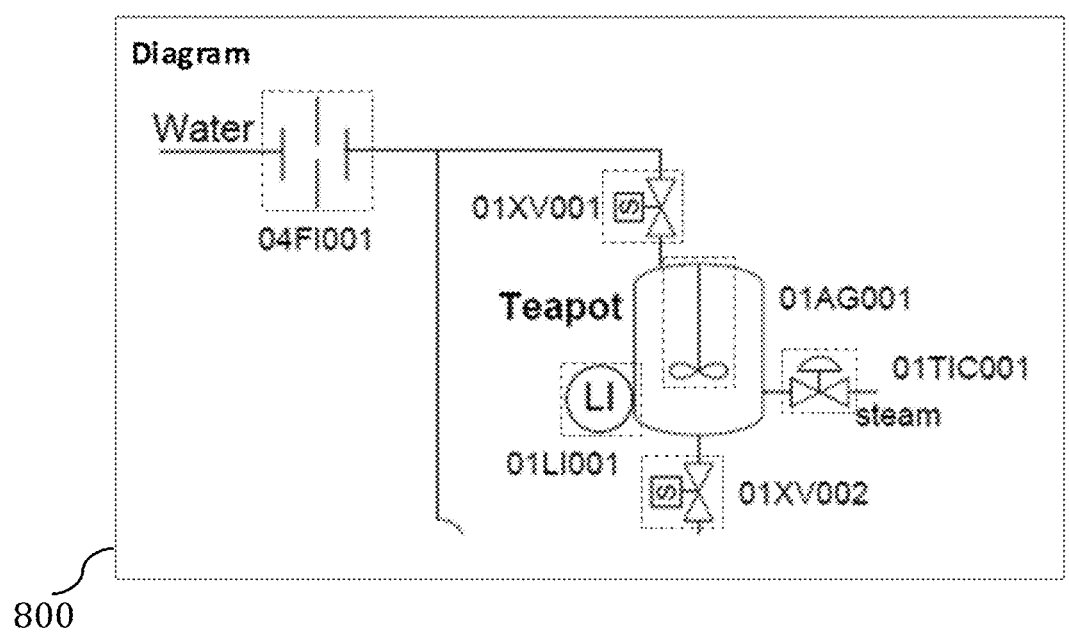

FIG. 1 illustrates an example of a P&ID.
FIG. 2 illustrates an exemplary sequential function chart.
FIG. 3 illustrates a representation of an exemplary SFC and corresponding program code of a type that may be linked to steps of the SFC.
FIG. 4 illustrates a SFC sequence editor of a kind that may be configured to enable generation of a SFC.
FIG. 5 provides a representation of a SFC sequence editor and a linked text based editor.
FIG. 6 illustrates a system configured in accordance with the teachings of the present invention, for generating SFCs.
FIG. 7 illustrates a display interface for a SFC sequence editor, configured according to the teachings of the present invention.
FIG. 8 is an exemplary diagrammatic representation of equipment that is used in an operation sequence, as generated by a SFC sequence editor that is configured according to the teachings of the present invention.
FIGS. 9 to 12 illustrates display menus implemented by SFC sequence editor, configured according to the teachings of the present invention.
FIGS. 13 to 19 are flowcharts representing various methods for generating SFCs in accordance with the teachings of the present invention.
FIG. 20 illustrates an exemplary computer system according to which various embodiments of the present invention may be implemented.

DETAILED DESCRIPTION

The invention provides, methods, systems and computer program products that enable generation of executable sequential function charts, for subsequent retrieval and implementation by a process control system.

FIG. 6 illustrates a system 600 configured for generation of executable sequential function charts, in accordance with the teachings of the invention. System 600 comprises a SFC sequence editor controller 602, a commands repository 604, an operating functions repository 606, a code generator controller 608, and program code 610 (for example, SEBOL code) generated through operation of system 600. The configuration and functionality of system 600 will be discussed in more detail below.

SFC sequence editor controller 602 may comprise a processor implemented controller configured to generate and control a display interface comprising at least a diagram panel, a control statements panel, a commands panel and a configuration parameters panel—the functionality whereof is described in more detail below.

Commands repository 604 comprises a non-transitory memory based repository of operating functions and control statements that have been added or selected by a user in connection with a particular SFC. A set of operating functions and control statements that are stored within commands repository 604 may be associated with the corresponding SFC for which the set of operating functions and control statements have been added or selected by the user.

Operating functions repository 606 comprises a non-transitory memory based repository that is used to store information representing sets of operating functions that are available to be performed in connection with a specific function block type.

For the purposes of this description, a "control statement" shall be understood as a statement or instruction that defines process flow control, enables setting of control paths, and/or enables repeated execution of one or more process steps.

For the purposes of this description, an "operating function" shall be understood as an action that may be performed on an equipment or component thereof—and which action results in a state change within the equipment or component. Non-limiting examples of "operating functions" are "Read PV", "Write PV", "Open", "Close", "Run", and "Stop" actions that are implantable on an equipment or component thereof.

For the purposes of this description, "function block" shall be understood as a set of instructions or code that defines and implements a function between input and output variables.

For the purposes of this description, "function block type" shall be understood as a category of function blocks, wherein function blocks associated with the category share a set of common properties, parameters or attributes.

Each equipment or corresponding one or more component that are intended for implementing a SFC has one or more corresponding function blocks. The corresponding function block(s) enables controlling, monitoring or interfacing with said equipment or component. Each such function block has a corresponding function block type. Yet further, each function block type has a corresponding set of operating functions associated therewith—such that every function block of such function block type would inherit the corresponding set of operating functions, which can be implemented in connection with that function block. Information identifying operating functions available for implementation in connection with each specific function block type is stored in and retrievable from operating functions repository 606.

Code generator controller 608 comprises a processor implemented code generator controller that is configured to generate syntactically correct program code (e.g. SEBOL code) by parsing, interpreting and compiling operating functions and control statements that have been selected by a user for implementation in connection with a SFC, and which may have been retrieved from commands repository 604.

FIG. 7 illustrates a display interface 700 generated and controlled by a SFC sequence editor, for implementing the present invention. In an embodiment, the display interface 700 may be generated by SFC sequence editor controller 602. Display interface 700 may be configured to include a plurality of interface sub-windows, including a diagram panel 702, a control statements panel 704, a commands panel 706 and a configuration parameters panel 708.

Display interface 700 or diagram panel 702 may be configured to enable generation, display and editing of diagrammatic representations of equipment or components involved in an operation sequence within a SFC. For example, diagram panel 702 may be used to generate a diagrammatic representation 800 (as shown in FIG. 8), wherein equipment or components within the drawing can be selected by the user from a library or menu of selectable diagrammatic representations of equipment or components thereof. In the diagrammatic representation 800, equipment or components within dashed-line boxes represent equipment or components that are selectable by a user. Each selected equipment or component may be associated with a function block identifier (for example, a function block name) and with a function block type.

In various embodiments, display interface 700 may be configured such that diagram panel 702 is configured to (i) enable a user to include drawings, illustrations or visual or diagrammatic representations of physical equipment or components involved in one or more operation sequences, (ii) enable a user to select illustrations or visual or diagrammatic representations of physical equipment or components from a library or menu, (iii) enable a user to associate equipment or components that are included within the diagram panel 702 with a corresponding function block identifier (e.g. function block name) and/or function block type, and (iv) enable display of operations associated with equipment or components that have been included within a drawing, illustration or visual or diagrammatic representation.

In an embodiment, display interface 700 may be configured such that receiving a user instruction (for example, a right click from a mouse or pointer device) on equipment or a component represented within diagram panel 702 results in display (for example, display of a drop down menu) of a list of operating functions that can be performed on the equipment or component(s) thereof. By way of example, operating functions associated with an equipment or one or more components may include any of the "open", "close", "run" or "stop" operating functions.

Figure 9:
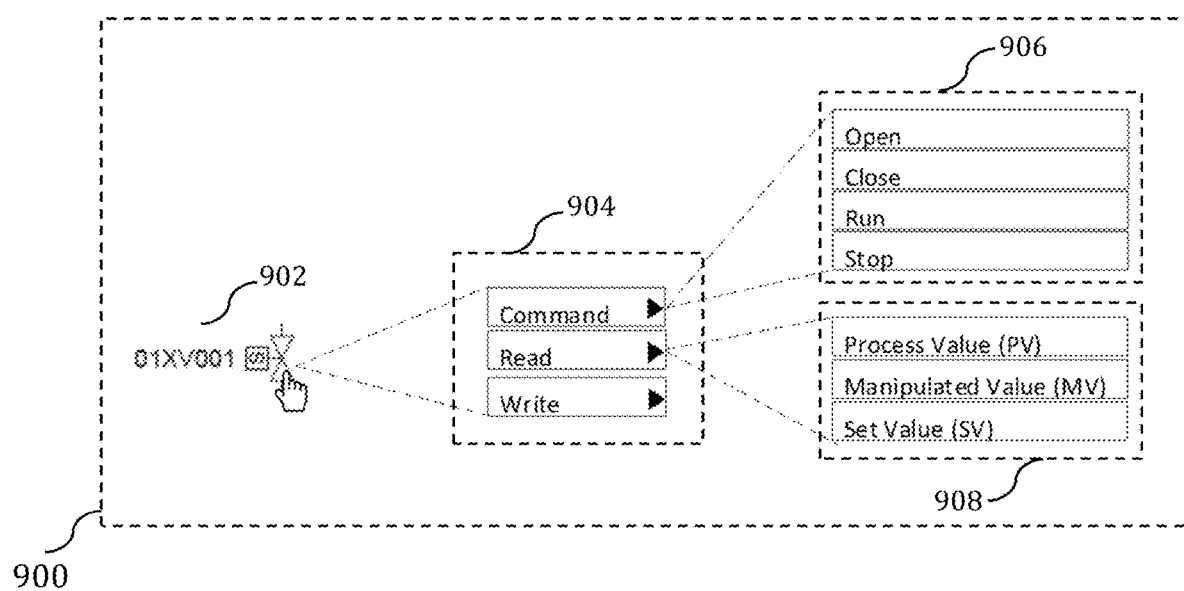

An exemplary instance of this embodiment is provided within the hierarchical context menu 900 illustrated in FIG. 9. FIG. 9 illustrates the manner in which, by selecting the valve device in the diagram 800, a user can choose to invoke a command to open/close/run/stop the valve, or to read/write the properties of the function block associated with said valve device (e.g. process, manipulate and set parameter values thereof). As will be observed from the hierarchical context menu 900 of FIG. 9, selecting an equipment corresponding to tag "01XV001" (which is a valve device) results in a drop down menu 904 providing selectable "command", "Read" and "Write" options. Selecting the "command" option in drop down menu 904 results in display of a drop down sub-menu 906 providing "Open", "Close", "Run" and "Stop" operating functions, while selecting either the "Read" or "Write" options in drop down menu 904 results in a drop down sub-menu 908 providing "Process value (PV)", "Manipulated value (MV)" and "Set value (SV)" operating functions, any of which can be selected for implementing either a "Read" or a "Write" instruction in connection with the selected equipment. The diagram panel 702 therefore enables various operating functions, and various operating parameters for the selected equipment or component(s) to be configured.

Figure 10:
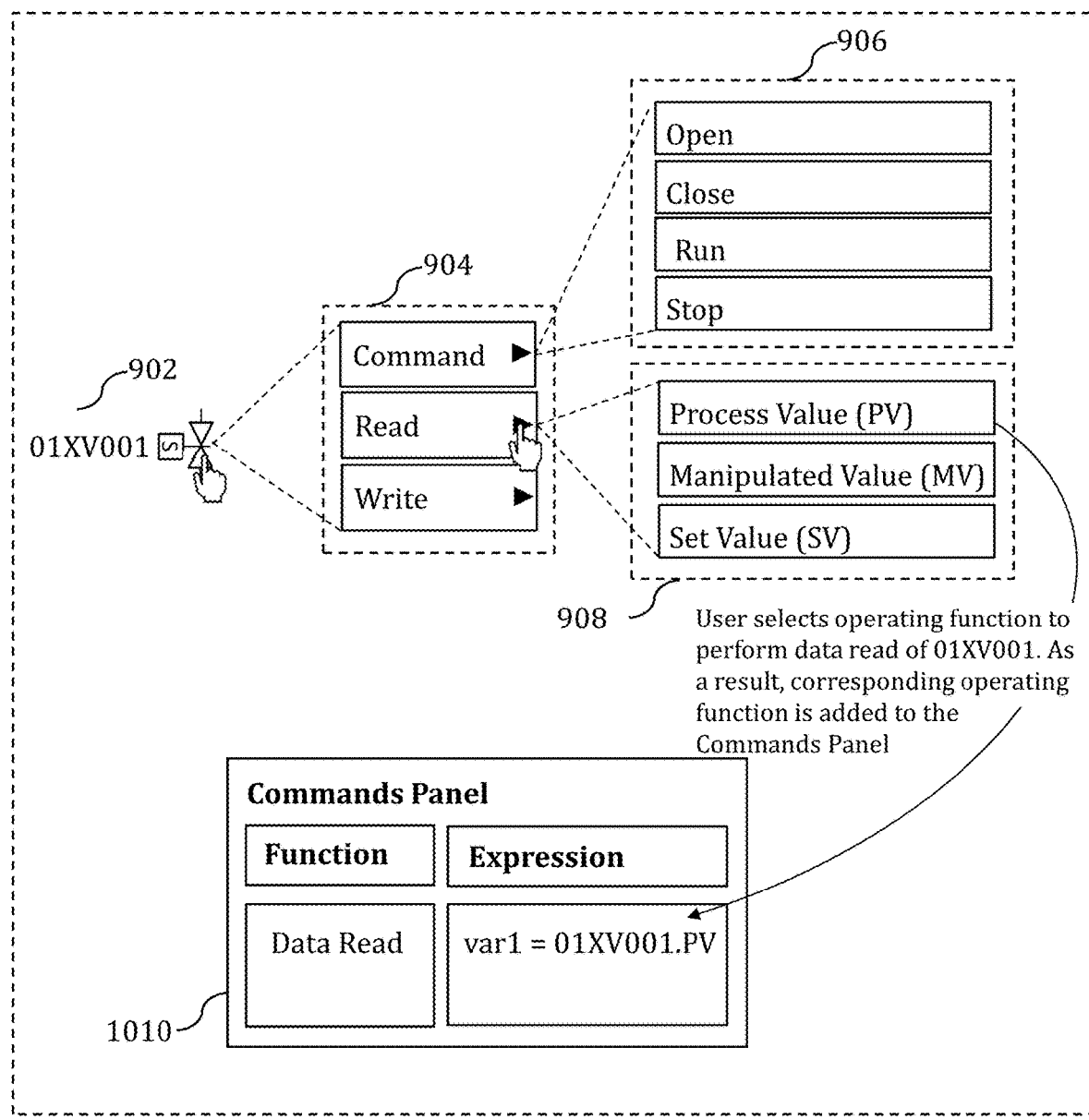

As illustrated in more detail in FIG. 10, selecting a specific operating function (e.g. an Open/Close/Run/Stop instruction for the valve device in FIG. 9) will add the selected operating function to the commands panel 706, 1010 within display interface 700.

Further, as illustrated in FIG. 10, the display interface 700 may be configured such that commands panel 706, 1010 includes at least two columns. A first column is used to display a function (i.e. a description of a selected operating function), and a second column is used to display an operation statement that will be executed in the program code (e.g. SEBOL code) as pseudocode, or in a manner or format similar to pseudocode.

Each operating function associated with an equipment or component may have a corresponding operating function type—wherein the operating function type comprises information representing a category to which the operating function corresponds. In other words, an operating function type represents a logical grouping of similar operating functions. For example, (i) the operating functions "Open" and "Close" may correspond to operating function type "Command", (ii) the operating functions "Read PV" and "Read MV" may correspond to operating function type "Read", and (iii) the operating functions "Write SV" and "Write PV" may correspond to operating function type "Write".

Each operating function type (i.e. each category of operating function) associated with or selected for an equipment or component may have different configuration parameters that are associated with operating functions of that operating function type. Stated differently, an operating function of a specific operating function type inherits the configuration parameters associated with that operating function type. Thus, operating functions that correspond to the same operating function type would typically have the same configuration parameters.

Figure 11:
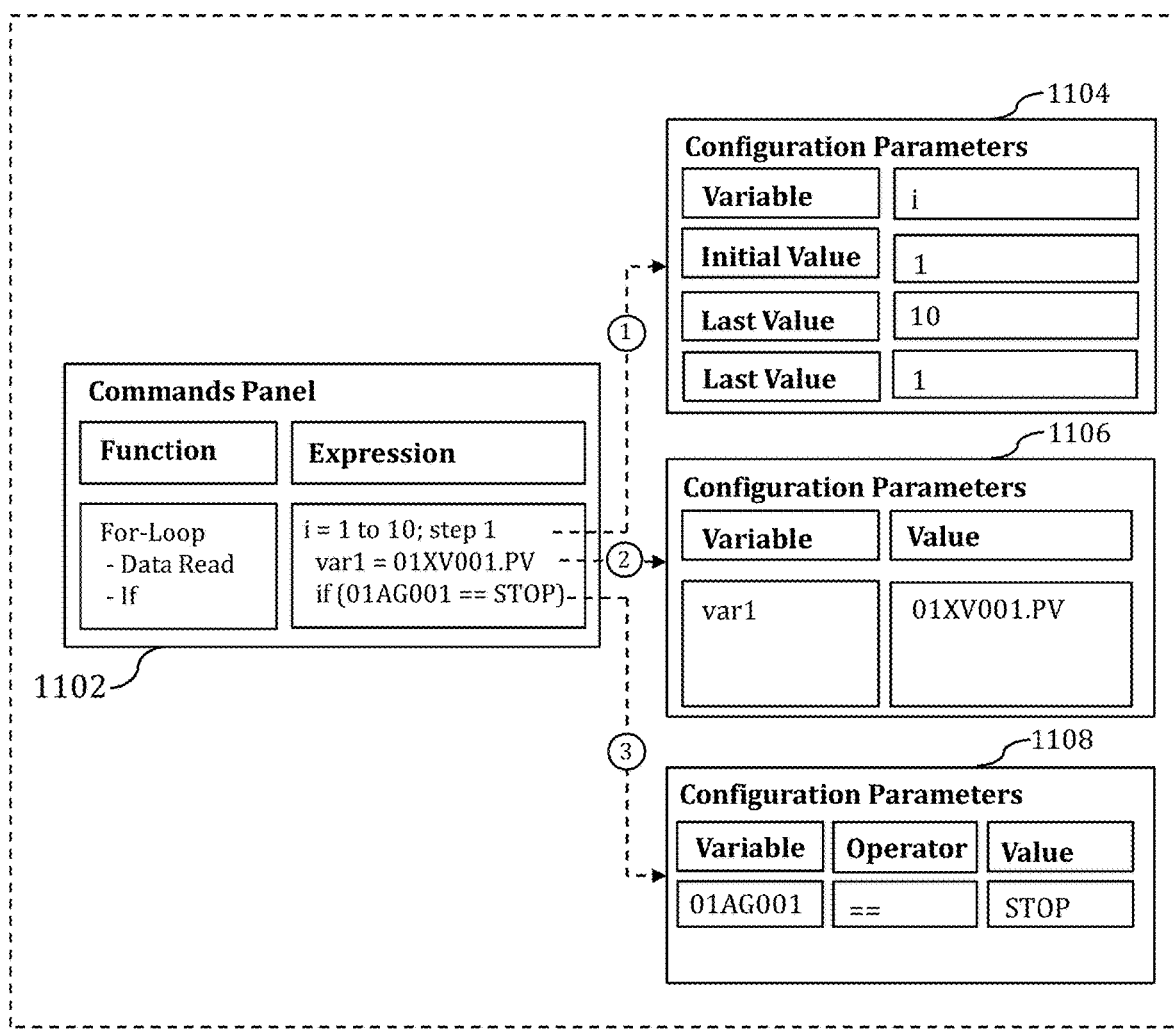

As shown in FIG. 11, the display interface 700 may be configured such that when operating functions are selected and added to the commands panel 1102, each operating function is assigned configuration parameters 1106 that are associated with an operating function type. Further, each configuration parameter may be assigned with a default value.

Display interface 700 may be configured such that configuration parameter values (including those that are default values assigned in the manner discussed above) may be modified by a user or control engineer through configuration parameters panel 708. For example, the initial default variable name "var1" as shown in configuration panel 1010 of FIG. 10 may subsequently be substituted with a more appropriate variable name through user input.

In addition to operating functions, one or more control statements may also be associated with an equipment or one or more components thereof.

Each control statement may have different configuration parameters that are associated with that control statement.

As shown in FIG. 11, each control statement that is represented within commands panel 1102 may be assigned configuration parameters 1104 and 1108 that are associated with the control statement. Each such control statement set of configuration parameter 1104 and 1108 may be assigned a default value.

Figure 12:
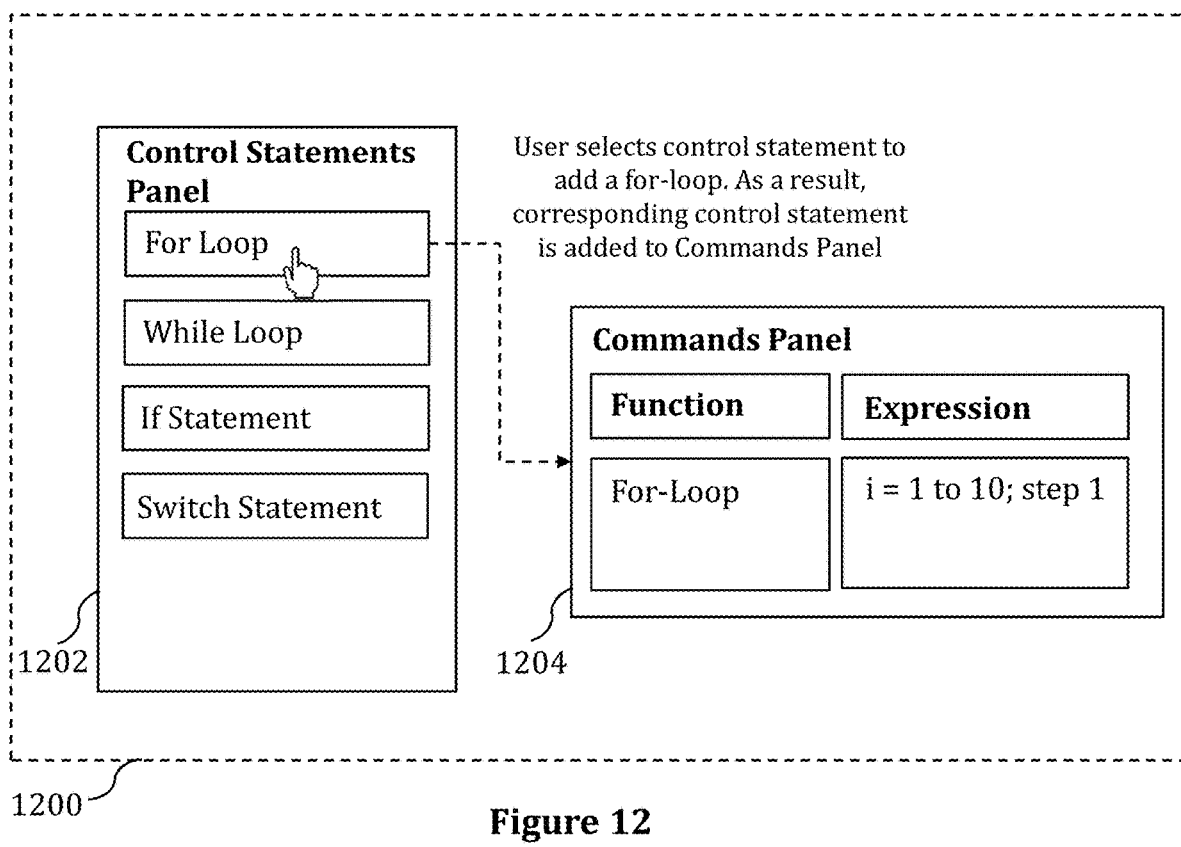

Display interface 700 may additionally be configured to enable control statements to be added through control statements panel 704. Such control statements (e.g. for-loop(s), while-loop(s), if-else statements) enable a user or operator to control the order and flow of the program code. As illustrated in FIG. 12, one or more control statements may be selected (from among a plurality of available template control statements) within the control statement panel 704 and can thus be added to the commands panel 706, 1010. Display interface 700 may be configured such that control statement parameters may initially be assigned default parameter values, and these default parameter values can be modified subsequently through the configuration parameters panel 708.

In an embodiment, display interface 700 may be configured such that control statements panel 704 displays a list of control statements that a user can select for inclusion within program code that is intended to be linked with or implemented within a SFC, and to select based on user input, one or more of the displayed control statements for inclusion within the program code.

Further, display interface 700 may be configured such that commands panel 706 is enabled to display a list of control statements and operations that have been selected by a user for inclusion within program code that is intended to be linked with or implemented within a SFC.

Yet further, display interface 700 may be configured such that configuration parameters panel 708 enables a user to modify configuration parameters of operating functions and/or control statements that have been selected for inclusion within program code that is intended to be linked with or implemented within a SFC.

Once all required operating functions and control statements have been appropriately populated and configured within the commands panel 706, a code generator (for example, a code generator implemented by code generator controller 608 of system 600 of FIG. 6) is executed to convert the operations and control statements into syntactically correct program code—e.g. a syntactically correct SEBOL program—which can be linked to, and directly used to implement, the corresponding SFC.

Figure 13:
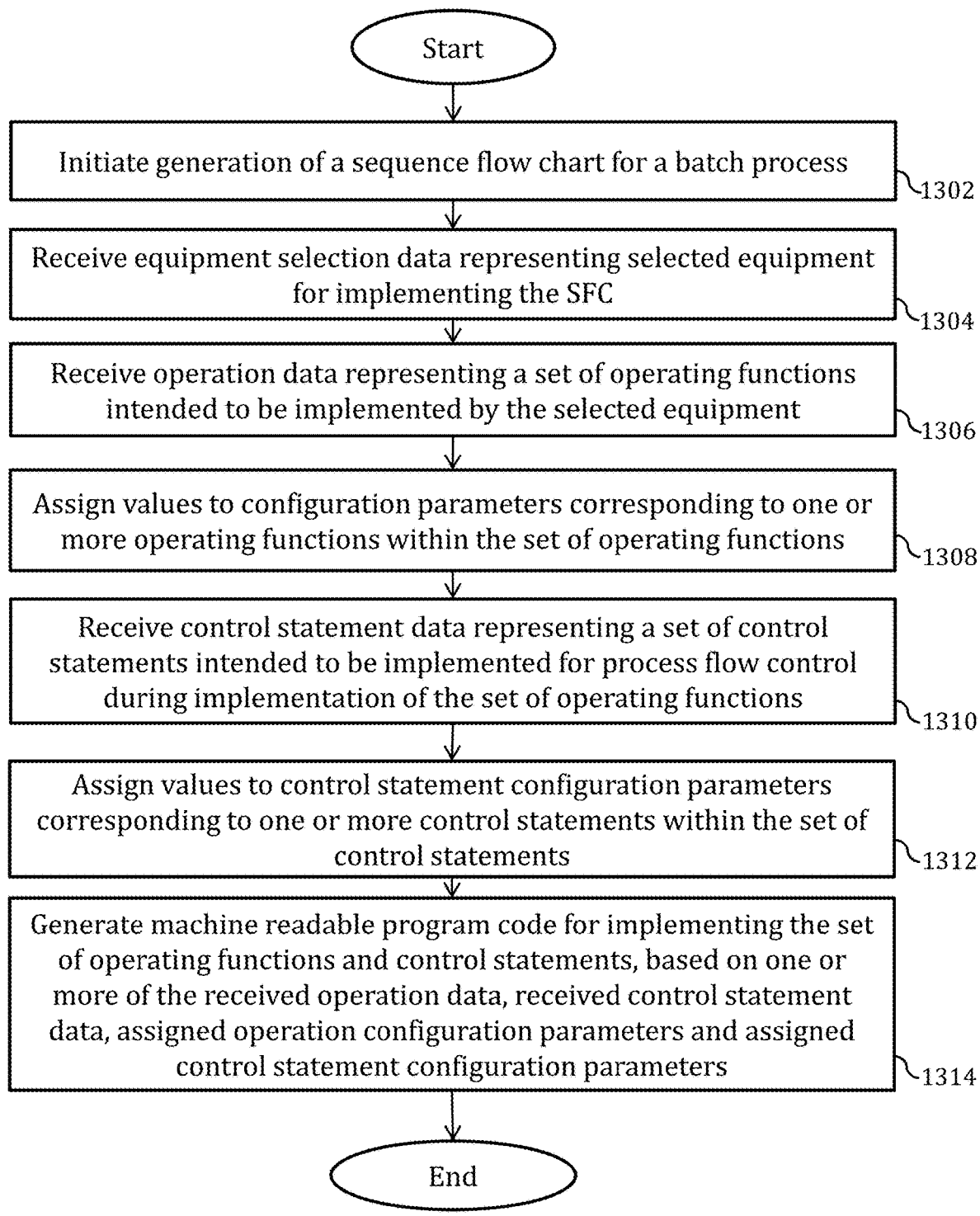

FIG. 13 illustrates a method of generating program codes within a SFC in accordance with the teachings of the present invention. In an embodiment, the method of FIG. 13 may be implemented within system 600 of FIG. 6.

Step 1302 comprises initiating the generation of a SFC for a batch process. The generation of the SFC may be initiated at SFC sequence editor controller 602 based on an initiation instruction received from a user.

Step 1304 comprises receiving equipment selection data representing selected equipment for implementing the SFC. The equipment selection data may comprise data identifying one or more equipment or components that have been selected by a user for implementation of operating functions within the SFC. Said data may be based on received user inputs that identify equipment or components selected by the user. In an embodiment, the user input(s) for selecting equipment or components may be received through diagrams panel 702 within display interface 700. Receiving equipment selection data may additionally include the step of receiving or retrieving data representing a function block and/or a function block type associated with each selected equipment or component. The received equipment selection data may be retrievably stored within the commands repository 604 of system 600, in a manner where the received equipment selection data is associated with a corresponding command stored within the commands repository 604. In an embodiment, the equipment selection data is stored within the commands repository 604 along with data associating said equipment selection data with a corresponding SFC or a corresponding step or operating function within the SFC.

Step 1306 comprises receiving operation data representing a set of operating functions intended to be implemented by the selected equipment or component. The data may represent one or more operating functions corresponding to the selected equipment or components that are identified based on information received at step 1304. In an embodiment, operating functions within the set of operating functions consist of one or more operating functions that have been associated with a function block type corresponding to the selected equipment or component. The data at step 1306 may be received through user inputs received within diagrams panel 702 within display interface 700.

Step 1308 comprises assigning values to one or more configuration parameters corresponding to one or more operating functions within the set of operating functions. For any configuration parameter, an assigned value may comprise either of a defined value/default value associated with that configuration parameter, or may include a user specified value. In an embodiment, one or more values may be assigned to operation configuration parameters based on user inputs received through configuration parameters panel 708 within display interface 700.

Step 1310 comprises receiving control statement data representing a set of control statements intended to be implemented for process flow control during implementation of the set of operating functions. The control statement data may represent one or more control statements corresponding to the selected equipment or components that are identified based on information received at step 1304. The control statements at step 1310 may be received through user inputs received within control statements panel 704 within display interface 700.

Step 1312 comprises assigning values to one or more control statement configuration parameters corresponding to one or more control statements within the set of control statements. For any control statement configuration parameters, an assigned value may comprise either of a defined value/default value associated with that control statement configuration parameter, or may include a user specified value. In an embodiment, one or more values may be assigned to control statement configuration parameters based on user inputs received through configuration parameters panel 708 within display interface 700.

Step 1314 comprises generating machine readable program code for implementing the set of operating functions and control statements, based on one or more of the received operation data, received control statement data, assigned operation configuration parameters and assigned control statement configuration parameters. In an embodiment, the machine readable code may be generated by code generator controller 608 of system 600. In a preferred embodiment, the machine readable code is SEBOL program code.

Figure 14:
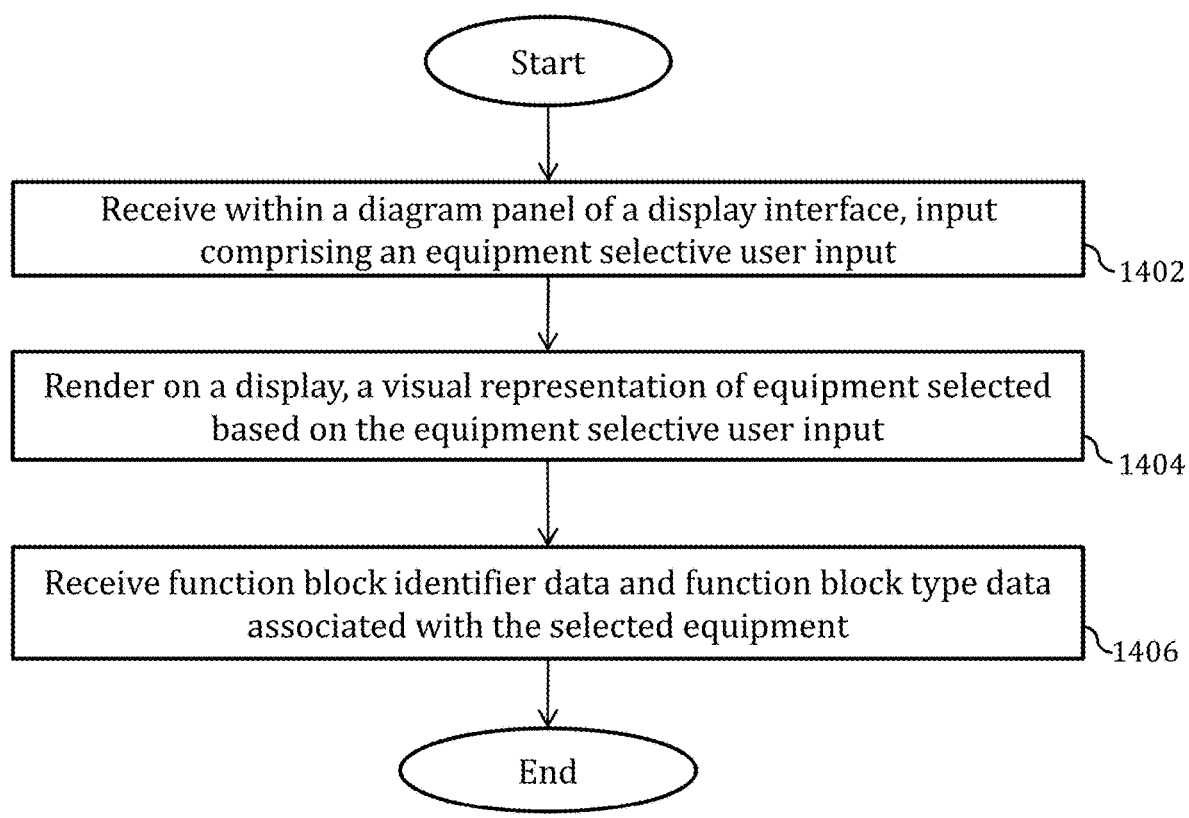

FIG. 14 illustrates a method of receiving equipment selection data in accordance with method step 1304 of FIG. 13. In an embodiment, the method of FIG. 14 may be implemented through diagrams panel 702 as implemented within display interface 700.

Step 1402 comprises receiving within a diagram panel 702 of a display interface 700, input comprising an equipment selective user input. The equipment selective user input may comprise user input identifying one or more equipment or components that have been selected by a user for implementation of operations within the SFC. The user inputs for selecting equipment or components may be received through diagrams panel 702 within display interface 700.

Step 1404 comprises rendering on a display, a visual representation of an equipment or a component selected based on the equipment selective user input received at step 1404.

Step 1406 comprises receiving function block identifier data and/or function block type data associated with the selected equipment or component. The function block identifier data and/or function block type data may be received through user input, or may be extracted from a P&ID, or may be retrieved from a database.

Figure 15:
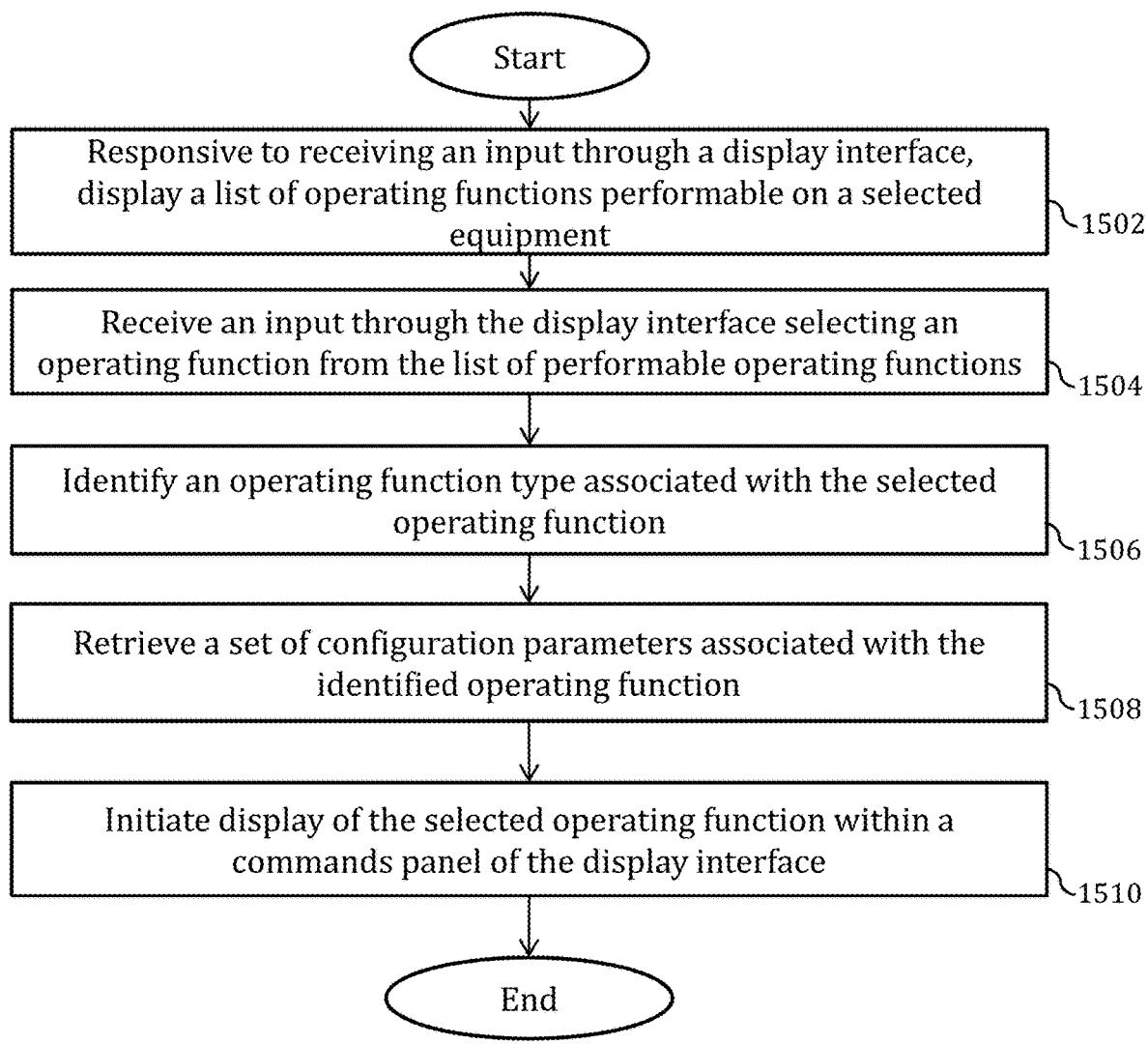

FIG. 15 illustrates a method of receiving operation data representing a set of operating functions intended to be implemented by a selected equipment or component in accordance with method step 1306 of FIG. 13. In an embodiment, the method of FIG. 15 may be implemented through diagrams panel 702 as implemented within display interface 700.

Step 1502 comprises responding to receiving a user input through a display interface 700 (for example through diagrams panel 702), by displaying a list of operating functions performable on a selected equipment or component. The user input may comprise any input through a user interface device—for example, a right click from a mouse or pointer device—in connection with an equipment or a component represented within diagram panel 702. The list of operating functions may be displayed in the form of a drop down menu or list that is displayed in response to the user input. An exemplary instance of display of a list of operating functions associated with an equipment or component, in response to receiving a user input, is illustrated in the hierarchical context menu 900 of FIG. 9. In an embodiment, the list of operating function associated with an equipment or component may comprise a list of operating function associated with a function block type that corresponds to the equipment or component.

Step 1504 comprises receiving a user input through the display interface, wherein said user input selects an operating function from the displayed list of performable operating functions. Again, the user input may comprise any input through a user interface device—for example, a left click from a mouse or pointer device—on an operating function that the user intends to select from the displayed list of performable operating functions.

Step 1506 comprises identifying an operating function type associated with the selected operating function. The operating function type may be identified based on defined or stored operating function type information associated with each operating function within the list of performable operating functions displayed at step 1502. In an embodiment, the operating function type may be identified by SFC sequence editor controller 602 based on data retrieved from operating functions repository 606.

Step 1508 comprises retrieving a set of configuration parameters associated with the identified operating function type.

Thereafter, step 1510 comprises initiating display of the selected operating function within a commands panel 706 of a display interface 700. In an embodiment, display of the selected operating function in commands panel 706 includes displaying a description of the selected operating function within a first column in the commands panel 706 and displaying pseudocode corresponding to the selected operating function in a second column in the commands panel.

Figure 16:
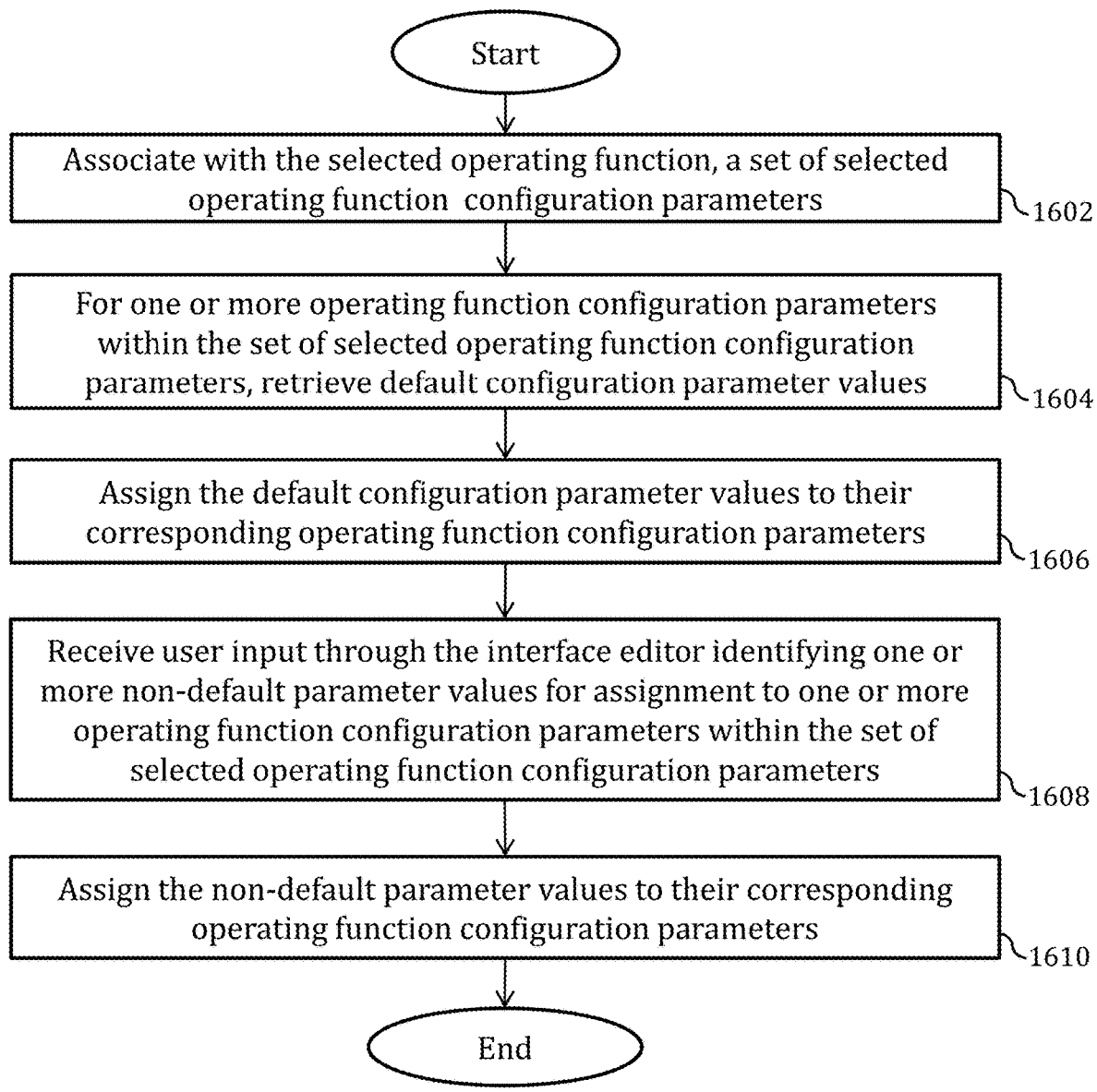

FIG. 16 is a flowchart illustrating a method of assigning configuration parameters to one or more operating functions within a set of operating functions. In an embodiment, the method of FIG. 16 is performed for the purposes of implementing step 1308 of the method of FIG. 13. In an embodiment, the method of FIG. 16 may be implemented within a SFC sequence editor controller 602.

Step 1602 comprises associating a selected operating function a set of selected operating function configuration parameters. The set of selected operating function configuration parameters may be identified based on one or more user inputs selecting or identifying operating function configuration parameters for association with the selected operating function. In an embodiment, the operating function configuration parameters may be selected by user input received through diagrams panel 702 within display interface 700.

At step 1604, default operating function configuration parameter values are retrieved, for one or more operating function configuration parameters within the set of selected operating function configuration parameters. The default operating function configuration parameter values may be retrieved from a database configured to store default operating function configuration parameter values. In an embodiment, the default operating function configuration parameter values may be retrieved from operating functions repository 606. The retrieval of the default operating function configuration parameter values may be implemented by SFC sequence editor controller 602.

Step 1606 comprises assigning the default operating function configuration parameter values to corresponding operating function configuration parameters associated with the selected operating function. In an embodiment, the assignment step may be implemented by SFC sequence editor controller 602.

Step 1608 comprises receiving user input through the display interface 700 (for example, through configuration parameters panel 708 within display interface 700), wherein the received user input identifies or specifies one or more non-default (e.g. user specified) parameter values for assignment to one or more operating function configuration parameters within the set of selected operating function configuration parameters.

Step 1610 comprises assigning the non-default (i.e. user specified) parameter values to operating function configuration parameters corresponding to the selected operating function. In an embodiment, assignment step 1610 may be implemented by SFC sequence editor controller 602.

Figure 17:
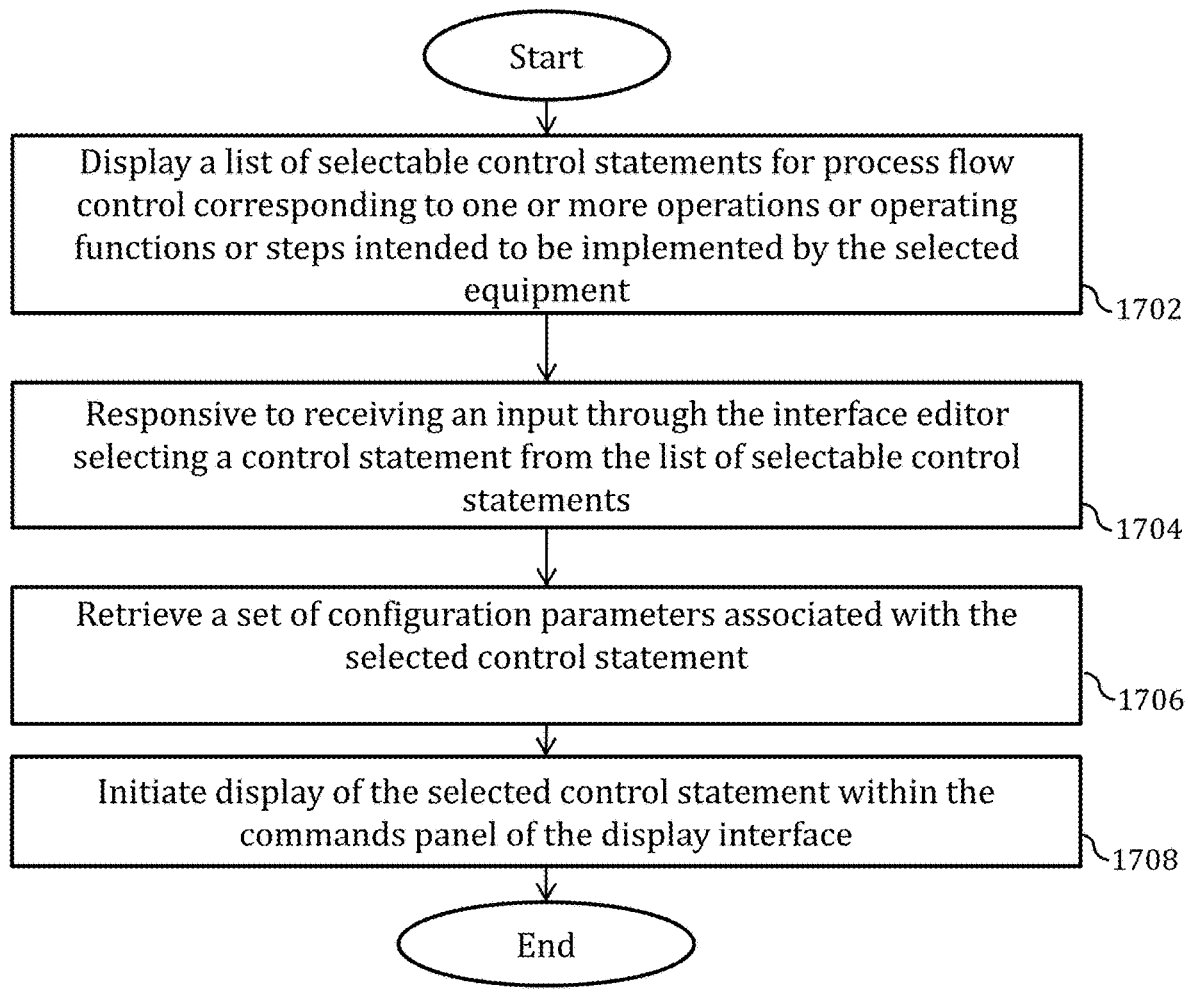

FIG. 17 is a flowchart illustrating a method for receiving control statement data representing a set of control statements intended to be implemented for process flow control during implementation of a set of operations. The method of FIG. 17 may be implemented for the purposes of method step 1308 of FIG. 13. In an embodiment, the method of FIG. 17 may be implemented through control statements panel 704 as implemented within display interface 700.

Step 1702 comprises displaying a list of selectable control statements for process flow control corresponding to one or more operations or operating functions or steps intended to be implemented by the selected equipment.

Step 1704 comprises responding to receiving of a user input through display interface 700 (for example, through control statements panel 704), by selecting a control statement from the list of selectable control statements. The user input may comprise any input through a user interface device—for example, a right click from a mouse or pointer device—on a control statement displayed within control statements panel 704.

Step 1706 comprises retrieving a set of configuration parameters associated with the selected control statement. The set of configuration parameters associated with the selected control statement may be retrieved by SFC sequence editor controller 602 from operating functions repository 606. In an embodiment the set of configuration parameters may be retrieved based on a determination that said set of configuration parameters are associated with the control statement.

Step 1708 comprises initiating display of the selected control statement within the commands panel 706 of display interface 700.

Figure 18:
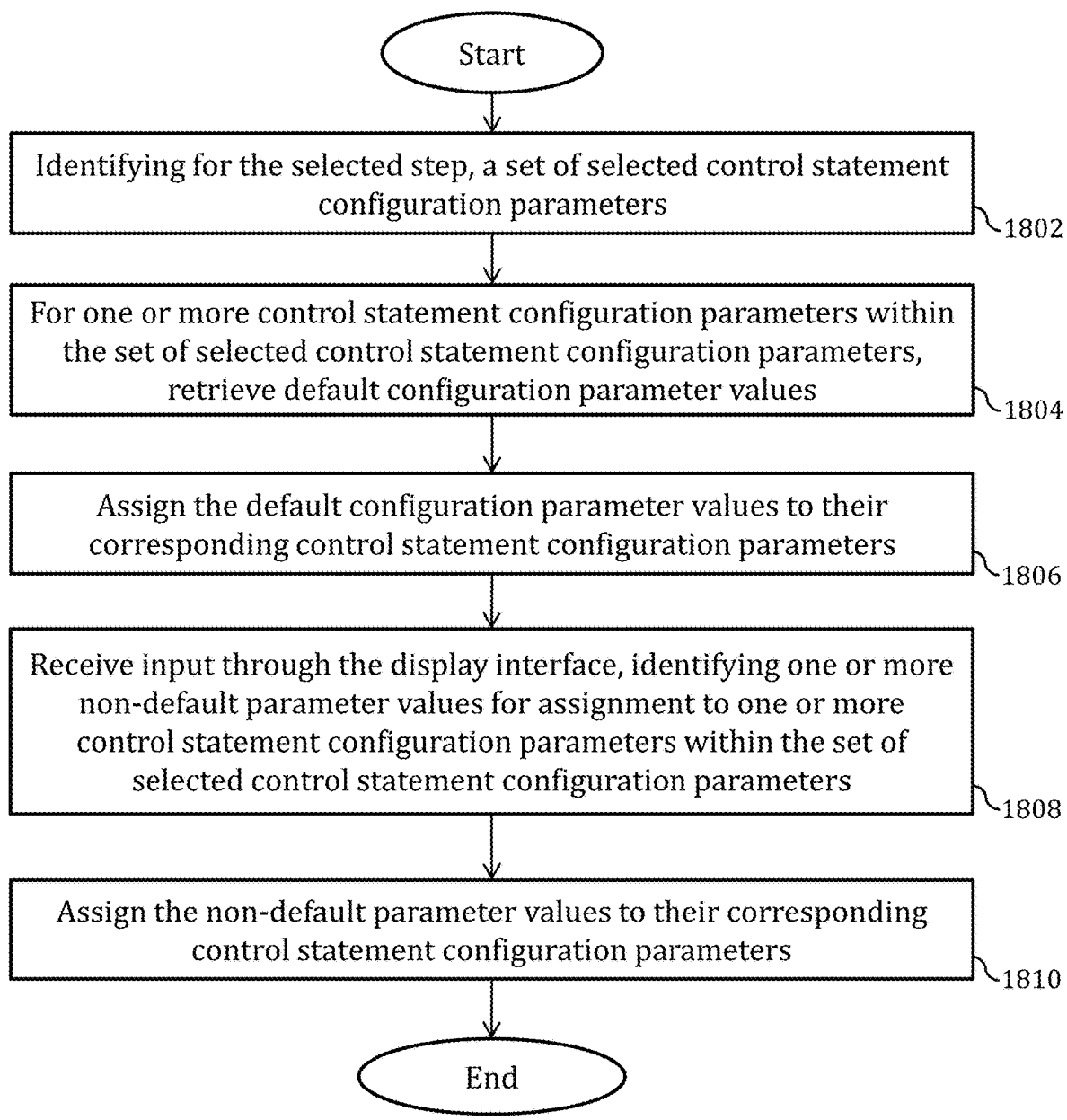

FIG. 18 is a flowchart illustrating a method of assigning control statement configuration parameters to one or more control statements within the set of control statements. The method of FIG. 18 may be performed for the purposes of step 1312 of implementing the method of FIG. 13. In an embodiment, the method of FIG. 18 may be implemented within a SFC sequence editor controller 602.

Step 1802 comprises identifying with a selected operating function, a set of selected control statement configuration parameters. The set of selected control statement configuration parameters may be identified based on one or more user inputs selecting or identifying control system configuration parameters for association with the selected operating function. In an embodiment, the control system configuration parameters may be selected by user input through control statements panel 708 within display interface 700.

Step 1804 comprises retrieving default configuration parameter values corresponding to one or more control statement configuration parameters within the set of selected control statement configuration parameters. The default control statement configuration parameter values may be retrieved from a database configured to store default control statement configuration parameter values. In an embodiment, the default control statement configuration parameter values may be retrieved from a repository or database (for example, a control statement repository or database, which is not explicitly illustrated in the accompanying figures). The retrieval of the default control statement configuration parameter values may be implemented by operation sequence builder controller 602.

Step 1806 comprises assigning the default configuration parameter values to their corresponding control statement configuration parameters. In an embodiment, the assignment step may be implemented by SFC sequence editor controller 602.

Step 1808 comprise receiving input through display interface 700 (for example, through configuration parameters panel 708 within display interface 700), wherein the received user input identifies or specifies one or more non-default (or user specified) parameter values for assignment to one or more control statement configuration parameters within the set of selected control statement configuration parameters.

Step 1810 comprises assigning the non-default (or user assigned) parameter values to their corresponding control statement configuration parameters. In an embodiment, assignment step 1610 may be implemented by SFC sequence editor controller 602.

Figure 19:
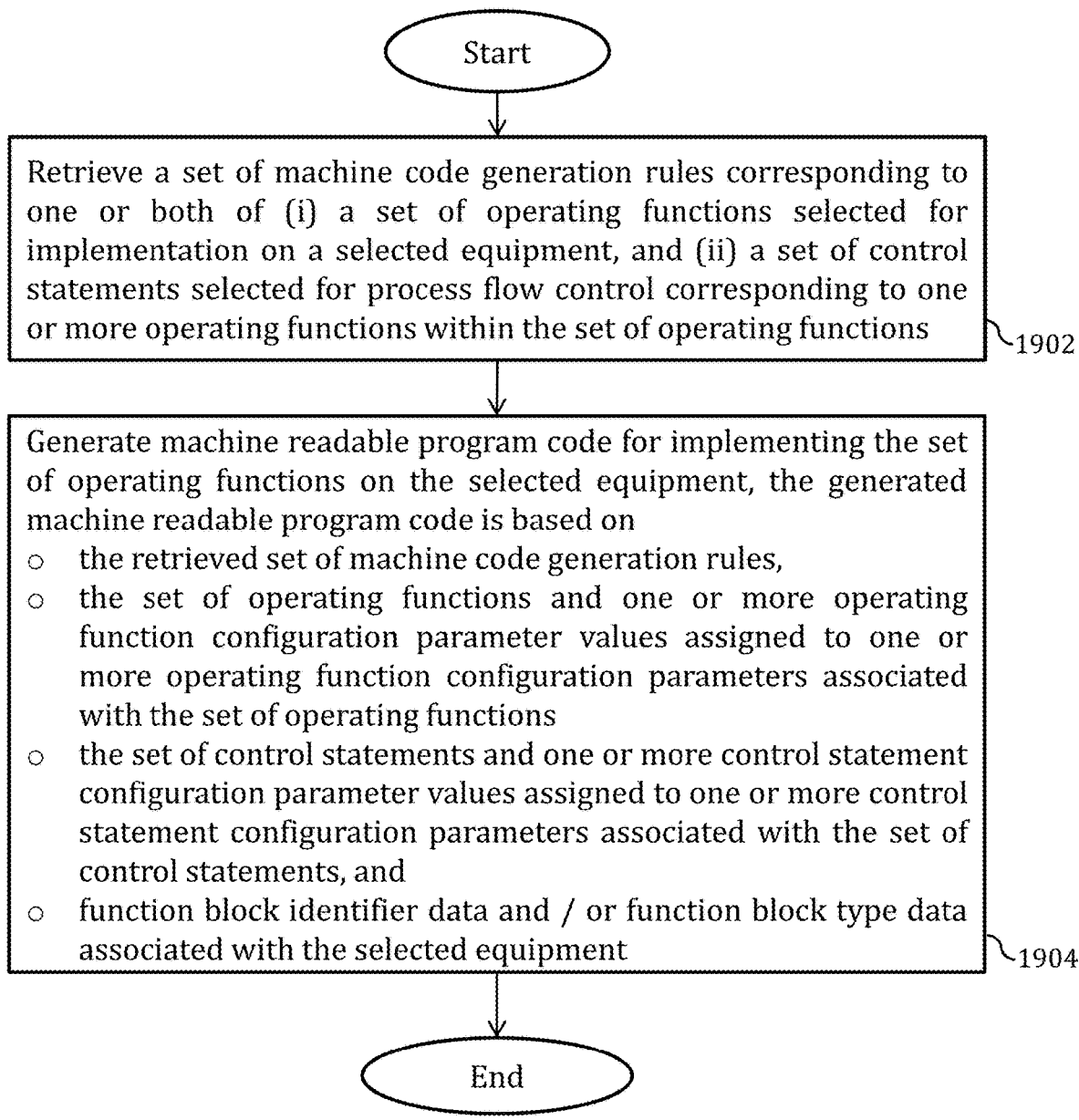
Figure 20:
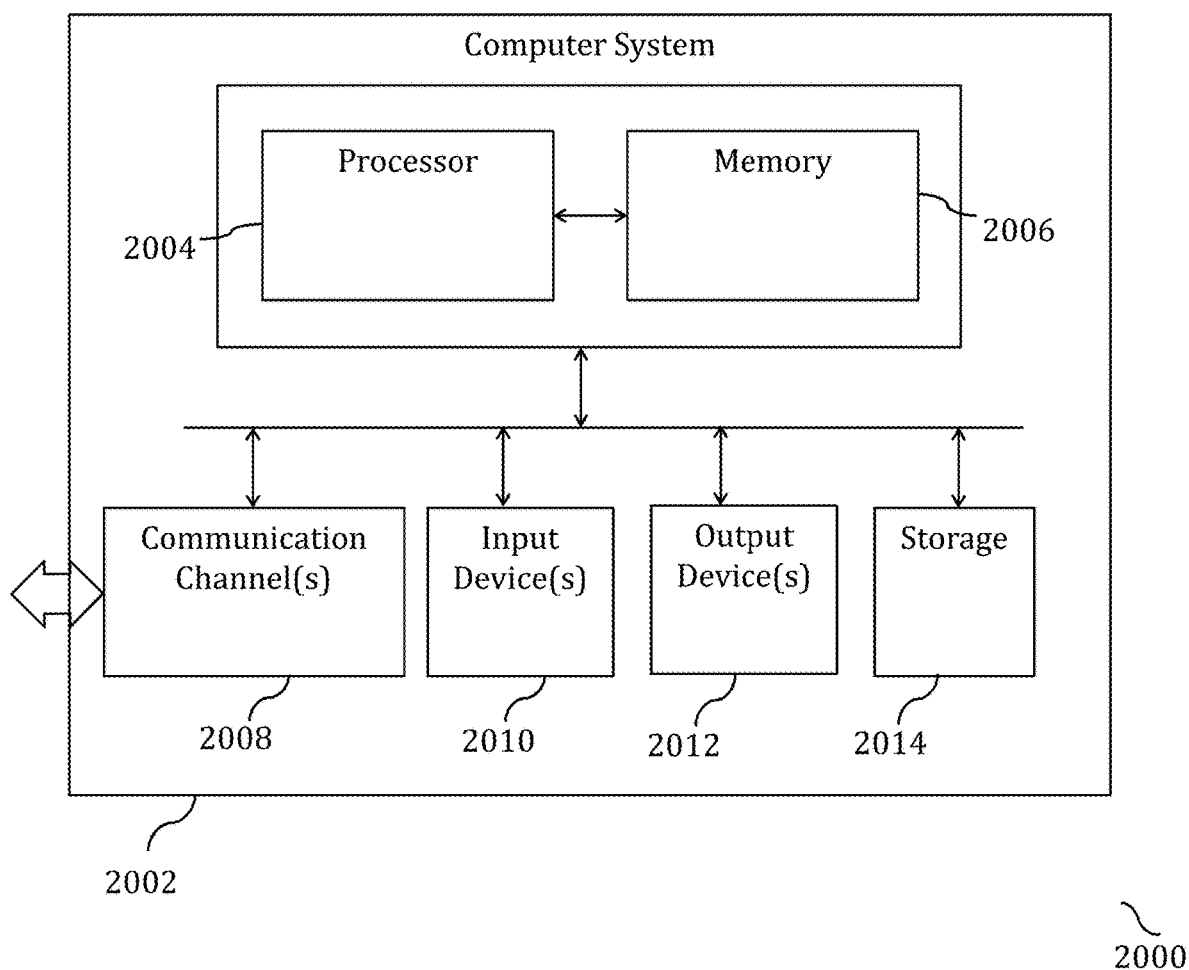

FIG. 19 is a flowchart illustrating a method of generating machine readable code for implementing the set of operating functions, based on one or more of the received operating functions, received control statement data, assigned operating function configuration parameters and assigned control statement configuration parameters. In an embodiment, the method of FIG. 19 is performed for implementing step 1314 of the method of FIG. 13. The method of FIG. 19 may be implemented by a processor implemented code generator controller 608 within system 600. In an embodiment, the method of FIG. 19 results in generation of SEBOL program code.

Step 1902 comprises retrieving a set of machine code generation rules corresponding to one or both of (i) a set of operating function selected for implementation on a selected equipment or component, and (ii) a set of control statements selected for process flow control corresponding to one or more operating function within the set of operating function.

Step 1904 comprises generating machine readable program code for implementing the set of operating function on the selected equipment or component, wherein the generated machine readable program code is based on (i) a retrieved set of machine code generation rules, (ii) a set of operating function and one or more operating function configuration parameter values assigned to one or more operating function configuration parameters associated with the set of operating functions, (iii) a set of control statements and one or more control statement configuration parameter values assigned to one or more control statement configuration parameters associated with the set of control statements, and (iv) function block identifier data and/or function block type data associated with the selected equipment or component. In an embodiment, the retrieved set of machine code generation rules may comprise a set of syntactical and/or lexical rules for generating machine readable code in a specified programming language. In a further embodiment, the retrieved set of machine code generation rules is a set of syntactical and/or lexical rules for generating SEBOL program code.

FIG. 20 illustrates an exemplary computer system according to which various embodiments of the present invention may be implemented.

System 2000 includes computer system 2002 which in turn comprises one or more processors 2004 and at least one memory 2006. Processor 2004 is configured to execute program instructions—and may be a real processor or a virtual processor. It will be understood that computer system 2002 does not suggest any limitation as to scope of use or functionality of described embodiments. The computer system 2002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 2002 in accordance with the present invention may include one or more servers, desktops, laptops, tablets, smart phones, mobile phones, mobile communication devices, tablets, phablets and personal digital assistants. In an embodiment of the present invention, the memory 2006 may store software for implementing various embodiments of the present invention. The computer system 2002 may have additional components. For example, the computer system 2002 may include one or more communication channels 2008, one or more input devices 2010, one or more output devices 2012, and storage 2014. An interconnection mechanism (not shown) such as a bus, controller, or network, interconnects the components of the computer system 2002.

In various embodiments of the present invention, operating system software (not shown) provides an operating environment for various softwares executing in the computer system 2002 using a processor 2004, and manages different functionalities of the components of the computer system 2002.

The communication channel(s) 2008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 2010 may include, but is not limited to, a touch screen, a keyboard, mouse, pen, joystick, trackball, a voice device, a scanning device, or any another device that is capable of providing input to the computer system 2002. In an embodiment of the present invention, the input device(s) 2010 may be a sound card or similar device that accepts audio input in analog or digital form. The output device(s) 2012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 2002.

The storage 2014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 2002. In various embodiments of the present invention, the storage 2014 may contain program instructions for implementing any of the described embodiments.

In an embodiment of the present invention, the computer system 2002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 2002. The method described herein is typically implemented as a computer program product, comprising a set of program instructions that is executed by the computer system 2002 or any other similar device. The set of program instructions may be a series of computer readable codes stored on a tangible medium, such as a computer readable storage medium (storage 2014), for example, diskette, CD-ROM, ROM, flash drives or hard disk, or transmittable to the computer system 2002, via a modem or other interface device, over either a tangible medium, including but not limited to optical or analogue communications channel(s) 2008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers significant advantages. In particular, the invention minimizes the amount of manual coding requirement for generating one or more SFCs for batch processes within a process control system. Additionally, the invention enables integration of visual representations of P&IDs (through diagram panels of the display interface) into a user interface, thereby eliminating the need to continuously switch between a P&ID and the user interface. Yet further, the invention enables users who may not have deep knowledge of process control system specific programming languages (such as SEBOL), to nevertheless generate SFCs that implement such programming languages.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A processor implemented method for generating program code within a sequential function chart for process control within a process control system, the method comprising:
    receiving equipment selection data representing a selected equipment for implementing a sequence flow;
    receiving operation data representing a set of operating functions intended to be implemented by the selected equipment;
    assigning values to one or more operating function configuration parameters corresponding to one or more operating functions within the set of operating functions;
    receiving control statement data representing a set of control statements intended to be implemented for process flow control during implementation of the set of operating functions;
    assigning values to one or more control statement configuration parameters corresponding to one or more control statements within the set of control statements; and
    generating machine readable program code for implementing the set of operating functions, based on one or more of the received operation data, the received control statement data, the assigned operating function configuration parameters and the assigned control statement configuration parameters.

2. The method as claimed in claim 1, wherein the step of receiving equipment selection data comprises:
    receiving within a display interface, input comprising an equipment selective user input;
    rendering on a display, a visual representation of an equipment selected based on the equipment selective user input; and
    receiving function block identifier data and function block type data associated with the selected equipment.

3. The method as claimed in claim 1, wherein the step of receiving operation data representing a set of operating functions intended to be implemented by the selected equipment, comprises:
    responding to receiving a user input, displaying a list of operating functions performable on the selected equipment;
    receiving, through another user input, a selected operating function from the displayed list of operating functions;
    identifying an operating function type associated with the selected operating function;
    retrieving a set of configuration parameters associated with the identified operating function type; and
    initiating a display of the selected operating function within a display interface.

4. The method as claimed in claim 1, wherein the step of assigning values to one or more operating function configuration parameters corresponding to one or more operating functions within the set of operating functions comprises:
    associating a set of selected operating function configuration parameters with a selected operating function;
    retrieving default operating function configuration parameter values for one or more operating function configuration parameters within the set of selected operating function configuration parameters;
    assigning the default operating function configuration parameter values to corresponding operating function configuration parameters associated with the selected operating function;
    receiving user input identifying one or more user specified parameter values for assignment to the one or more operating function configuration parameters within the set of selected operating function configuration parameters; and
    assigning the user specified parameter values to the corresponding operating function configuration parameters associated with the selected operating function.

5. The method as claimed in claim 1, wherein the step of receiving control statement data representing a set of control statements intended to be implemented for process flow control during implementation of the set of operating functions comprises:
    displaying a list of selectable control statements for process flow control corresponding to the one or more operating functions within the set of operation functions intended to be implemented by the selected equipment;
    selecting based on a user input, a control statement from the list of selectable control statements;
    retrieving a set of configuration parameters associated with the selected control statement; and
    initiating display of the selected control statement within a display interface.

6. The method as claimed in claim 1, wherein the step of assigning values to one or more control statement configuration parameters corresponding to one or more control statements within the set of control statements comprises:
    identifying a set of control statement configuration parameters corresponding to a control statement within the set of control statements;
    retrieving default configuration parameter values corresponding to one or more control statement configuration parameters within the identified set of control statement configuration parameters;
    assigning the default configuration parameter values to corresponding control statement configuration parameters;

receiving user input identifying one or more user specified parameter values for assignment to the one or more of the control statement configuration parameters; and assigning the user specified parameter values to the corresponding control statement configuration parameters.

7. The method as claimed in claim 1, wherein the step of generating machine readable program code for implementing the set of operating functions comprises:

retrieving a set of machine code generation rules corresponding to (i) a set of operating functions selected for implementation on the selected equipment, and (ii) a set of control statements selected for process flow control corresponding to one or more operating functions within the set of operating functions; and generating machine readable program code for implementing the set of operating functions on the selected equipment, wherein the generated machine readable program code is based on (i) a retrieved set of machine code generation rules, (ii) a set of operating functions and one or more operating function configuration parameter values assigned to one or more operating function configuration parameters associated with the set of operating functions, (iii) a set of control statements and one or more control statement configuration parameter values assigned to one or more control statement configuration parameters associated with the set of control statements, and (iv) a function block type data associated with the selected equipment.

8. A system for generating program code within a sequential function chart for process control within a process control system, the system comprising:

a memory; and a processor configured for: receiving equipment selection data representing a selected equipment for implementing a sequence flow;

receiving operation data representing a set of operating functions intended to be implemented by the selected equipment;

assigning values to one or more operating function configuration parameters corresponding to one or more operating functions within the set of operating functions;

receiving control statement data representing a set of control statements intended to be implemented for process flow control during implementation of the set of operating functions;

assigning values to one or more control statement configuration parameters corresponding to one or more control statements within the set of control statements; and generating machine readable program code for implementing the set of operating functions, based on one or more of the received operation data, the received control statement data, the assigned operating function configuration parameters and the assigned control statement configuration parameters.

9. The system as claimed in claim 8, configured such that the step of receiving equipment selection data comprises:

receiving within a display interface, input comprising an equipment selective user input;

rendering on a display, a visual representation of an equipment selected based on the equipment selective user input; and receiving function block identifier data and function block type data associated with the selected equipment.

10. The system as claimed in claim 8, configured such that the step of receiving data representing a set of operating functions intended to be implemented by the selected equipment, comprises:

responding to receiving a user input, displaying a list of operating functions performable on the selected equipment;

receiving, through another user input, a selected operating function from the displayed list of operating functions;

identifying an operating function type associated with the selected operating function;

retrieving a set of configuration parameters associated with the identified operating function type; and initiating display of the selected operating function within a display interface.

11. The system as claimed in claim 8, configured such that the step of assigning values to one or more operating function configuration parameters corresponding to one or more operating functions within the set of operating functions comprises:

associating a set of selected operating function configuration parameters with a selected operating function;

retrieving default operating function configuration parameter values for one or more operating function configuration parameters within the set of selected operating function configuration parameters;

assigning the default operating function configuration parameter values to corresponding operating function configuration parameters associated with the selected operating function;

receiving user input identifying one or more user specified parameter values for assignment to one or more operating function configuration parameters within the set of selected operating function configuration parameters; and assigning the user specified parameter values to the corresponding operating function configuration parameters associated with the selected operating function.

12. The system as claimed in claim 8, configured such that the step of receiving control statement data representing a set of control statements intended to be implemented for process flow control during implementation of the set of operating functions comprises:

displaying a list of selectable control statements for process flow control corresponding to the one or more operating functions within the set of operation functions intended to be implemented by the selected equipment;

selecting based on a user input, a control statement from the list of selectable control statements;

retrieving a set of configuration parameters associated with the selected control statement; and initiating display of the selected control statement within a display interface.

13. The system as claimed in claim 8, configured such that the step of assigning values to one or more control statement configuration parameters corresponding to one or more control statements within the set of control statements comprises:

identifying a set of control statement configuration parameters corresponding to a control statement within the set of control statements;

retrieving default configuration parameter values corresponding to one or more control statement configuration parameters within the identified set of control statement configuration parameters;

assigning the default configuration parameter values to corresponding control statement configuration parameters;

receiving user input identifying one or more user specified parameter values for assignment to one or more of the control statement configuration parameters; and assigning the user specified parameter values to the corresponding control statement configuration parameters.

14. The system as claimed in claim 8, configured such that the step of generating machine readable program code for implementing the set of operating functions comprises:

retrieving a set of machine code generation rules corresponding to (i) a set of operating functions selected for implementation on the selected equipment, and (ii) a set of control statements selected for process flow control corresponding to one or more operating functions within the set of operating functions; and generating machine readable program code for implementing the set of operating functions on the selected equipment, wherein the generated machine readable program code is based on (i) a retrieved set of machine code generation rules, (ii) a set of operating functions and one or more operating function configuration parameter values assigned to one or more operating function configuration parameters associated with the set of operating functions, (iii) a set of control statements and one or more control statement configuration parameter values assigned to one or more control statement configuration parameters associated with the set of control statements, and (iv) a function block type data associated with the selected equipment.

15. A computer program product for generating program code within a sequential function chart for process control within a process control system, the computer program product comprising a non-transitory computer usable medium having a computer readable program code embodied therein, the computer readable program code comprising instructions for implementing within a processor based computing system, the steps of:

receiving equipment selection data representing a selected equipment for implementing a sequence flow;

receiving data representing a set of operating functions intended to be implemented by the selected equipment;

assigning values to one or more operating function configuration parameters corresponding to one or more operating functions within the set of operating functions;

receiving control statement data representing a set of control statements intended to be implemented for process flow control during implementation of the set of operating functions;

assigning values to one or more control statement configuration parameters corresponding to one or more control statements within the set of control statements; and generating machine readable program code for implementing the set of operating functions, based on one or more of the received operation data, the received control statement data, the assigned operating function configuration parameters and the assigned control statement configuration parameters.

* * * * *